(12) United States Patent
Takeda et al.

(10) Patent No.: US 9,840,750 B2
(45) Date of Patent: Dec. 12, 2017

(54) MEDIUM CARBON STEEL SHEET FOR COLD WORKING AND METHOD FOR MANUFACTURING THE SAME

(75) Inventors: Kengo Takeda, Tokyo (JP); Masayuki Abe, Tokyo (JP); Yasushi Tsukano, Tokyo (JP); Takashi Aramaki, Tokyo (JP); Shinichi Yamaguchi, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 671 days.

(21) Appl. No.: 14/343,580

(22) PCT Filed: Sep. 22, 2011

(86) PCT No.: PCT/JP2011/071618
§ 371 (c)(1),
(2), (4) Date: Mar. 7, 2014

(87) PCT Pub. No.: WO2013/042239
PCT Pub. Date: Mar. 28, 2013

(65) Prior Publication Data
US 2014/0212660 A1    Jul. 31, 2014

(51) Int. Cl.
| | | |
|---|---|---|
| *C22C 38/04* | (2006.01) | |
| *C21D 8/02* | (2006.01) | |
| *C22C 38/38* | (2006.01) | |
| *C22C 38/58* | (2006.01) | |
| *C22C 38/00* | (2006.01) | |
| *C22C 38/02* | (2006.01) | |
| *C22C 38/06* | (2006.01) | |
| *C22C 38/18* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *C22C 38/40* | (2006.01) | |
| *C22C 38/60* | (2006.01) | |
| *C21D 1/18* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *C22C 38/12* | (2006.01) | |
| *C22C 38/14* | (2006.01) | |
| *C22C 38/08* | (2006.01) | |
| *C22C 38/16* | (2006.01) | |

(52) U.S. Cl.
CPC .............. *C21D 8/0263* (2013.01); *C21D 1/18* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *Y10T 428/265* (2015.01)

(58) Field of Classification Search
CPC ....................................................... C22C 38/04
See application file for complete search history.

(56) References Cited

U.S. PATENT DOCUMENTS

2009/0065106 A1* 3/2009 Kimura ................ C21D 1/32
148/624

FOREIGN PATENT DOCUMENTS

| | | |
|---|---|---|
| CN | 101210298 | 7/2008 |
| CN | 101213317 | 7/2008 |
| EP | 1932933 | 6/2008 |
| JP | A-52-020967 | 2/1977 |

(Continued)

OTHER PUBLICATIONS

English Machine Translation of JP 2000265240 A of Jufuku et al., published Sep. 26, 2000.*

(Continued)

*Primary Examiner* — Roy King
*Assistant Examiner* — Jophy S Koshy
(74) *Attorney, Agent, or Firm* — Birch, Stewart, Kolasch & Birch, LLP

(57) ABSTRACT

A medium carbon steel sheet for cold working that has a hardness of 500 HV to 900 HV when subjected to high-frequency quenching and a quick cooling to a room temperature is carried out. The medium carbon steel sheet includes, by mass %, C: 0.30 to 0.60%, Si: 0.06 to 0.30%, Mn: 0.3 to 2.0%, P: 0.03% or less, S: 0.0075% or less, Al: 0.005 to 0.10%, N: 0.001 to 0.01%, and Cr: 0.001 to 0.10%, the balance composed of Fe and inevitable impurities. An average diameter d of a carbide is 0.6 μm or less, a spheroidizing ratio p of the carbide is equal to or more than 70% and less than 90%, and the average diameter d (μm) of the carbide and the spheroidizing ratio p % of the carbide satisfy the expression $d \leq 0.04 \times p - 2.6$.

4 Claims, 6 Drawing Sheets

(56) References Cited

FOREIGN PATENT DOCUMENTS

| | | |
|---|---|---|
| JP | A-05-007969 | 1/1993 |
| JP | A-09-268344 | 10/1997 |
| JP | A-10-008085 | 1/1998 |
| JP | 10-081891 | 3/1998 |
| JP | A-11-080884 | 3/1999 |
| JP | A-2000-144307 | 5/2000 |
| JP | 2000265240 A * | 9/2000 |
| JP | A-2000-265240 | 9/2000 |
| JP | A-2001-059128 | 3/2001 |
| JP | A-2001-329333 | 11/2001 |
| JP | A-2001-355047 | 12/2001 |
| JP | A-2002-264252 | 9/2002 |
| JP | A-2002-275579 | 9/2002 |
| JP | 2005-139550 | 6/2005 |
| JP | 2005-146366 | 6/2005 |
| JP | 2005-350705 | 12/2005 |
| JP | WO 2007/043318 A1 * | 4/2007 ............... C21D 1/32 |
| JP | 2007-270327 | 10/2007 |
| JP | A-2007-277696 | 10/2007 |
| WO | WO2007/086202 | 8/2007 |

OTHER PUBLICATIONS

English Machine Translation of JP 2007270327 A of Yoyota el al. published Oct. 2007.*

Notice of Allowance dated Dec. 4, 2012 issued in Japanese Patent Application No. 2010-070820 [with English Translation].

International Search Report dated Dec. 20, 2011 issued in corresponding PCT Application No. PCT/JP2011/071618 [with English Translation].

Office Action dated Sep. 16, 2013 from corresponding Taiwanese Application No. 100133935 [with English Translation].

Office Action dated May 12, 2015 issued in corresponding CN Application No. 201180073554.9 (Attached Only Search Report).

Office Action dated Jun. 25, 2015 issued in corresponding CA Application No. 2,848,028.

* cited by examiner

BEFORE WORKING → AFTER WORKING

MEDIUM CARBON STEEL SHEET FOR COLD WORKING AND METHOD FOR MANUFACTURING THE SAME

This application is a national stage application of International Application No. PCT/JP2011/071618, filed Sep. 22, 2011, which is incorporated by reference in its entirety.

TECHNICAL FIELD

The present invention relates to a medium carbon steel sheet for cold working, which has excellent cold workability and which has a strength that may be increased even in a quenching treatment, represented by high-frequency quenching, in a short heat-treatment time, and a method for manufacturing the same.

BACKGROUND ART

A medium carbon steel sheet has been widely used as a material for a chain, a gear, a clutch, a saw, a blade, and the like. To make the material into a product, a process of shaping the material into a predetermined shape and hardening the material using a heat treatment such as quenching and tempering is commonly performed. Therefore, both workability and hardenability are required for medium carbon steel sheets. Particularly, in recent years, a working technology has been developed, wherein a shaping method in which compression working and tension working are performed at the same time, and the working ratio is higher compared to the related art has been adopted. Therefore, it is necessary for a medium carbon steel sheet to have shaping properties capable of enduring hard working. Furthermore, according to recent demands for energy conservation, there are movements to change the quenching and tempering process from a furnace heating type in the related art to a high-frequency heating type. To adapt the changing needs, it is necessary to develop a medium carbon steel sheet that is soft before cold working, endures working during the cold working, and has an excellent hardenability after high-frequency heating (hereinafter, referred to as high-frequency hardenability. In addition, quenching after high-frequency heating is referred to simply as "high-frequency quenching).

CITATION LIST

Patent Document

[Patent Document 1] Japanese Unexamined Patent Application, First Publication No. H11-80884
[Patent Document 2] Japanese Unexamined Patent Application, First Publication No. H09-268344
[Patent Document 3] Japanese Unexamined Patent Application, First Publication No. 2001-329333
[Patent Document 4] Japanese Unexamined Patent Application, First Publication No. 2001-355047

SUMMARY OF INVENTION

Technical Problem

In the related art, various researches on a relationship between workability and high-frequency hardenability of the medium carbon steel sheet have been conducted (for example, refer to Patent Document 1 to Patent Document 4). However, it is considered that an example which has an excellent cold workability, and in which the hardenability can be sufficiently secured at a heating rate of 100° C./second or more has not been reported.

For example, Patent Document 1 discloses medium and high carbon steel sheets consist of hypo-eutectoid steel that contains 0.1 to 0.8 mass % of C and 0.01 mass % or less of S. In these medium and high carbon steel sheets, carbide is dispersed in ferrite in such a manner that the carbide spheroidizing ratio becomes 90% or more. The average particle size of the carbide is 0.4 to 1.0 μm, and the ferrite grain size is adjusted to be 20 μm or more as necessary. However, in the medium and high carbon steel sheet, local ductility is improved by appropriately controlling the shape of the carbide as described above, thereby improving the stretch-flange property. However, it is considered working characteristics of these sheets regarding both compression working and tension working are not sufficient.

In addition, Patent Document 2 discloses a high strength steel for high-frequency quenching, which is excellent in static strength, bending fatigue strength, and rolling contact fatigue strength as well as in cold forgeability. In the steel for high-frequency quenching, a specific shape of the carbide, which is necessary to obtain forgeability, is not clearly disclosed, and specific conditions such as the heating temperature and the holding time during quenching are not specified.

In addition, Patent Document 3 discloses steel for high-frequency quenching, which is excellent in cold forgeability and in which a limit upsetting rate is high. However, specific conditions such as the heating temperature and the holding time during the quenching are not specified, and it is not clear that the hardenability is actually excellent.

Furthermore, Patent Document 4 discloses a carbon steel tube excellent in cold workability and high-frequency hardenability. It is considered that the high carbon steel tube is suitable for a working method such as swaging and tube expansion that depend on local ductility, but cold forgeability in terms of punching, drawing, bending, burring, upsetting, ironing, extrusion, and the like, which are the targets of the present invention, is not sufficient.

The cold working that is a target of the present invention represents various kinds of working such as punching, drawing, bending, burring, ironing, and extrusion, and hard compression and tension are applied during these kinds of working. In a case where the above-described cold working is applied to a medium carbon steel sheet, it is considered that a crack due to interfacial peeling is generated and propagates between a ferrite phase and carbide, and thus cracking occurs. Therefore, adjustment of the chemical compositions and shape control of the carbide are important to prevent interfacial peeling during the working.

In addition, a material, which is cold worked, is frequently subjected to a quenching treatment. However, in the high-frequency quenching treatment in which a heat treatment time is short, the carbide in the material is not sufficiently dissolved during the heating, and thus it is difficult to obtain stable hardenability. Therefore, shape control of the carbide in the material is important to sufficiently dissolve the carbide during the high-frequency quenching.

However, it is considered that points of problems in a case where cold working is applied to the medium carbon steel sheet and the high-frequency quenching is performed are not clear until now.

In addition, in the present invention, a medium carbon steel sheet represents a steel sheet which contains 0.30 to 0.60% of C, and which has a sheet thickness of 1.6 to 20 mm.

The present invention has been made in consideration of the above-described circumstances, and an object thereof is to provide a medium carbon steel sheet which has excellent cold workability and thus has sufficient quenching hardenability even in a high-frequency quenching treatment, and which has excellent high-frequency hardenability, and a manufacturing method of the same.

Solution to Problem

The present inventors conducted thorough research looking for a method of accomplishing the above-described object. As a result, it is found that in addition to adjustment of chemical composition of a steel sheet, when the average diameter of carbide and the spheroidizing ratio of the carbide are controlled to satisfy predetermined conditions, a medium carbon steel sheet, in which the hardness during cold working decreases and thus the cold workability becomes excellent, and which has sufficient quenching hardenability even in a high-frequency quenching treatment at an average heating rate of 100° C./second or more, may be provided.

The present invention has been made based on this finding, and the gist thereof is as follows.

(1) According to an aspect of the present invention, there is provided a medium carbon steel sheet for cold working that has a hardness of 500 HV to 900 HV in a case of being subjected to high-frequency quenching in which a temperature is raised at an average heating rate of 100° C./second, the temperature is held at 1,000° C. for 10 seconds, and a quick cooling to a room temperature is carried out at an average cooling rate of 200° C./second. The medium carbon steel sheet includes, by mass %, C: 0.30 to 0.60%, Si: 0.06 to 0.30%, Mn: 0.3 to 2.0%, P: 0.030% or less, S: 0.0075% or less, Al: 0.005 to 0.10%, N: 0.001 to 0.01%, and Cr: 0.001 to 0.10%, the balance composed of Fe and inevitable impurities. An average diameter d of a carbide is 0.6 µm or less, a spheroidizing ratio p of the carbide is equal to or more than 70% and less than 90%, and the average diameter d (µm) of the carbide and the spheroidizing ratio p % of the carbide satisfy d≤0.04×p−2.6.

(2) In the medium carbon steel sheet for cold working according to (1), further includes one or more of, by mass %, Ni: 0.01 to 0.5%, Cu: 0.05 to 0.5%, Mo: 0.01 to 0.5%, Nb: 0.01 to 0.5%, Ti: 0.001 to 0.05%, V: 0.01 to 0.5%, Ta: 0.01 to 0.5%, B: 0.001 to 0.01%, W: 0.01 to 0.5%, Sn: 0.003 to 0.03%, Sb: 0.003 to 0.03%, and As: 0.003 to 0.03%, (3) In the medium carbon steel sheet for cold working according to (2), a Cr content [Cr] and a Mo content [Mo] may satisfy [Cr]+[Mo]/10<0.10.

(4) In the medium carbon steel sheet for cold working according to (1) or (2), the hardness before the cold working may be equal to or more than 120 HV and less than 170 HV.

(5) In the medium carbon steel sheet for cold working according to (1) or (2), the medium carbon steel sheet may further include a surface treatment film that contains each of chemical compositions derived from a silanol bond that contains a metal component X and is expressed by Si—O—X, a heat-resistant resin, an inorganic acid salt, and a lubricant on at least one surface, the surface treatment film may have a concentration gradient for each of the chemical compositions in a film thickness direction, and have three layers including an adhesion layer, a base layer, wherein the three layers are positioned in order from an interface between the surface treatment film and the medium carbon steel sheet for cold working of the adhesion layer, the base layer and the lubricant layer, the adhesion layer may contain largest amount of the chemical composition derived from the silanol bond among the three layers, and may have a thickness of 0.1 nm to 100 nm; the base layer may contain largest amount of the heat-resistant resin and the inorganic acid salt among the three layers, may contain 0.01 to 10 parts by mass of the inorganic acid salt to 100 parts by mass of the heat-resistant resin, and may have a thickness of 0.1 µm to 15 µm; the lubricant layer may contain largest amount of the lubricant among the three layers, and has a thickness of 0.1 µm to 10 µm; and a ratio of the thickness of the base layer to the thickness of the lubricant layer may be 0.2 to 10.

(6) In the medium carbon steel sheet for cold working according to (5), the inorganic acid salt may be at least one of compound selected from a group consisting of a phosphate, a borate, a silicate, a molybdate, and a tungstate.

(7) In the medium carbon steel sheet for cold working according to (5), the heat-resistant resin may be at least one resin selected from a group consisting of a polyimide resin, a polyester resin, an epoxy resin, and a fluorine resin.

(8) In the medium carbon steel sheet for cold working according to (5), the lubricant may be at least one compound selected from a group consisting of a polytetrafluoroethylene, a molybdenum disulfide, a tungsten disulfide, a zinc oxide, and a graphite.

(9) According to another aspect of the present invention, there is provided a method for manufacturing medium carbon steel sheet for cold working, the method including: a first process of holding a temperature of a cast slab having a chemical composition according to (1) or (2) at 1,050 to 1,300° C.; a second process of performing a hot rolling in which rolling is terminated at 750 to 1,000° C. for the cast slab to obtain a steel sheet after the first process; a third process of cooling the steel sheet to a first cooling termination temperature of 500 to 700° C. at a first average cooling rate of 20 to 50° C./second after the second process; a fourth process of cooling the steel sheet to a second cooling termination temperature that is equal to or higher than 400° C. and equal to or lower than a temperature that is lower than the first cooling termination temperature by 50° C. at a second average cooling rate of 5 to 30° C./second, and coiling the steel sheet after the third process; a fifth process of holding the steel sheet so that a time held at a temperature range of 400° C. to the second cooling termination temperature is limited to 30 hours or less after the fourth process; and a sixth process of performing annealing by heating the steel sheet to a temperature of 600° C. to $A_{c1}$ point-10° C. and holding the steel sheet in this temperature for a time equal to or more than 5 hours and less than 100 hours after the fifth process.

(10) In the method for manufacturing the medium carbon steel sheet for cold working according to (9), in the sixth process, a dew point at 400° C. or lower may be less than −20° C., the dew point at a temperature higher than 400° C. may be less than −40° C., and a concentration of hydrogen may be 95% or more.

(11) In the method for manufacturing the medium carbon steel sheet according to (9) or (10), a water-based surface treatment liquid, which contains a water-soluble silane coupling agent, a water-soluble inorganic acid salt, a water-soluble heat-resistant resin, and a lubricant, may be applied onto at least one surface of the medium carbon steel sheet for cold working, and the surface treatment liquid may be dried to form the surface treatment film on at least one surface of the medium carbon steel sheet for cold working after the sixth process.

Advantageous Effects of Invention

According to the present invention, it is possible to provide a medium carbon steel sheet for cold working, which has low hardness (soft) before cold working and has excellent workability for both compression working and tension working, and thus has sufficient quenching hardenability even in a high-frequency quenching treatment at an average heating rate of 100° C./second or more after the cold working, and compatibility between cold workability and high-frequency hardenability, which is capable of securing high strength, is realized; and a method for manufacturing the same.

DESCRIPTION OF EMBODIMENTS

Figure 1:
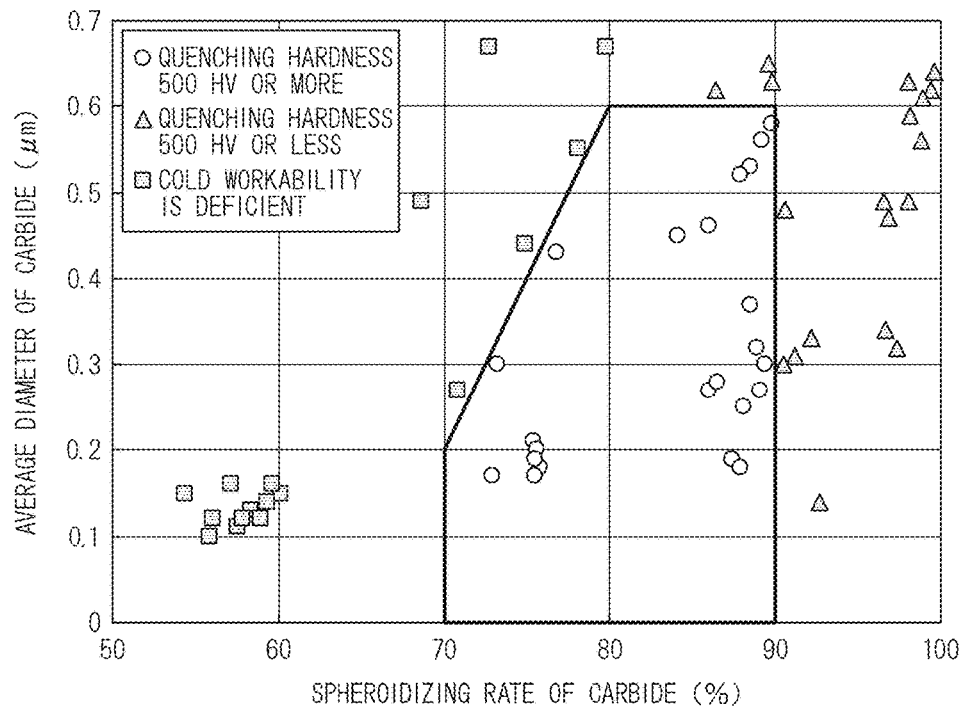
FIG. 1 is a diagram illustrating an effect of the average diameter of carbide and the spheroidizing ratio of the carbide on quenching hardness and cold workability.

Hereinafter, the present invention will be described in detail.

First, a description will be provided with respect to the reason for limitation regarding chemical composition of a steel sheet for cold working according to an embodiment of the present invention (hereinafter, may be referred to as a "steel sheet of this embodiment"). In addition, "%" represents "mass %" in the following description.

C: 0.30 to 0.60%

C is an important element to secure the quenching strength of a steel sheet. Therefore, C is added in the steel in an amount of 0.30% or more to secure necessary strength. When the C content is less than 0.30%, the hardenability decreases, and the strength needed for a high-strength steel sheet to be used in mechanical structure may not be obtained, and thus the lower limit of the C content is 0.30%. When the C content exceeds 0.60%, the percentage of carbide, which acts as a starting point of fracture, increases, and cold workability deteriorates, and thus the upper limit of the C content is 0.60%. In a case where it is necessary to further secure hardenability, it is preferable that the lower limit of the C content be 0.35%, more preferably be 0.37%, and still more preferably be 0.40%. In addition, to further easily control the shape of the carbide, it is preferable that the upper limit of the C content be 0.55%, more preferably be 0.52%, and still more preferably be 0.50%.

Si: 0.06 to 0.30%

Si is an element that acts as a deoxidizer and is effective for suppressing interfacial peeling between ferrite and carbide during working and for improving hardenability. When the Si content is less than 0.06%, this addition effect may not be obtained, and thus the lower limit of the Si content is 0.06%. On the other hand, when the Si content exceeds 0.30%, since the frequency of crack occurrence (a frequency of transgranular crack occurrence) in a ferrite phase increases due to solid solution strengthening, and the surface texture deteriorate due to scale defects during hot rolling, the upper limit of the Si content is 0.30%. In the case of further reducing of the peeling at the interface of between the ferrite and the carbide, it is preferable that the lower limit of the Si content be 0.10%, more preferably be 0.13%, and still more preferably be 0.15%. In addition, to further reduce the generation of cracks (transgranular crack) in the ferrite phase, it is preferable that the upper limit of the Si content be 0.26%.

Mn: 0.3 to 2.0%

Mn is an element that acts as a deoxidizer and is effective at improving hardenability. When the Mn content is less than 0.3%, this addition effect may not be obtained, and thus the lower limit of the Mn content is 0.3%. When the Mn content exceeds 2.0%, dissolution of the carbide during high-frequency heating becomes slow, and the hardenability (quenching hardness) decreases, and thus the upper limit of the Mn content is 2.0%. In the case of further increasing of the hardenability, it is preferable that the lower limit of the Mn content be 0.5%, more preferably be 0.55%, and still more preferably be 0.65% or 0.73%. In addition, to further secure the high-frequency hardenability, it is preferable that the upper limit of the Mn content be 1.6%, more preferably be 1.4%, and still more preferably be 1.2% or 1.0%.

P: 0.030% or Less

P is a solid solution strengthening element, and is an element that is effective for increasing the strength of the steel sheet. When P is excessively contained in steel, toughness decreases, and thus the upper limit of the P content is 0.030%. P is an inevitable impurity. When the P content is reduced to be less than 0.005%, the refining cost increases, and thus the P content does not need to be reduced to less than 0.005%. In a case where relatively higher toughness is necessary, it is preferable that the upper limit of the P content be 0.020%.

S: 0.0075% or Less

Figure 5:
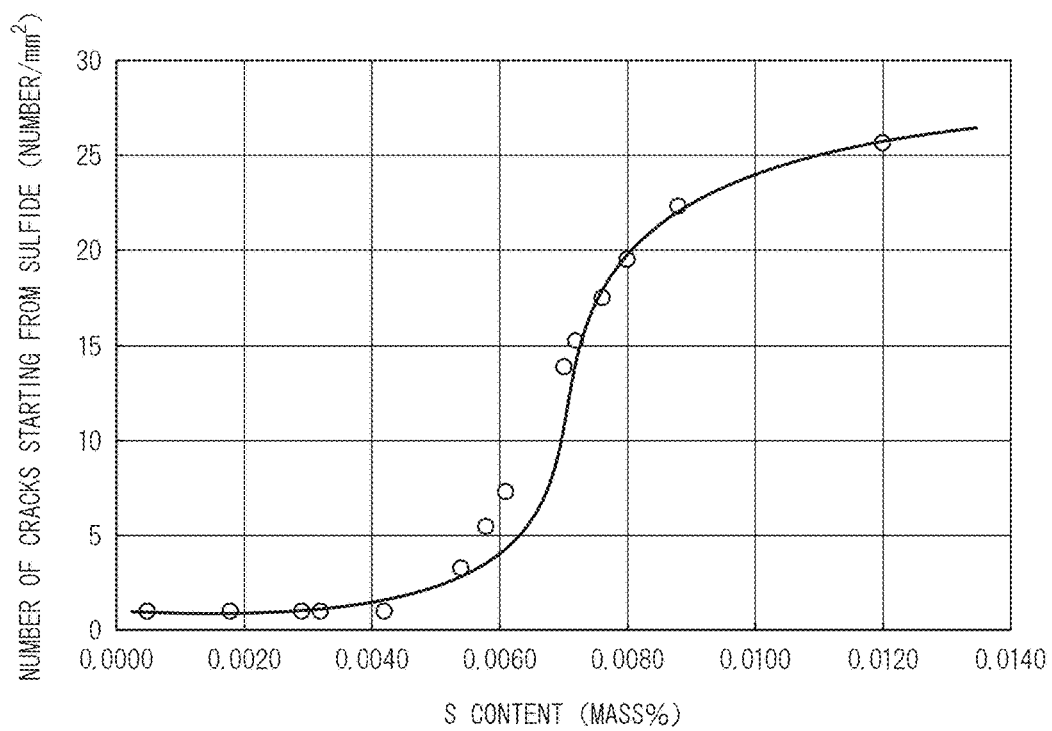
FIG. 5 is a diagram illustrating a relationship between the S content and the number of cracks starting from sulfide.

S forms a non-metallic inclusion (sulfide) and becomes a cause of deterioration of workability and toughness after a heat treatment, and thus the upper limit of the S content is 0.0075% or less. FIG. 5 shows a relationship between the S content and the number of cracks in which the sulfide acts as the starting point (cracks starting from the sulfide) during cold working. As can be seen from FIG. 5, when the S content is 0.0075% or less, the number of the cracks starting from the sulfide largely decreases. In addition, S is an inevitable impurity. When the S content is reduced to be less than 0.0001%, the refining cost greatly increases, and thus the S content does not need to be reduced to less than 0.0001% or equal to or less than 0.001%. In addition, in a case where it is necessary to secure relatively higher workability and toughness, it is preferable that the upper limit of the S content be 0.007%, and more preferably be 0.005%.

Al: 0.005 to 0.10%

Al is an element that acts as a deoxidizer and is effective for fixation of N. When the Al content is less than 0.005%, this addition effect may not be sufficiently obtained, and thus the lower limit of the Al content is 0.005%. When the Al content exceeds 0.10%, the addition effect is saturated, and there is a tendency for a surface defect to occur, and thus the upper limit of the Al content is 0.10%. To further sufficiently fix N, it is preferable that the lower limit of the Al content be 0.01%. In addition, to further reliably suppress the occurrence of surface defects, the upper limit of the Al content may be set to 0.07% or 0.05%.

N: 0.001 to 0.01%

N is a nitride forming element. In curved-type continuous casting, when the nitride precipitates during bending correction of cast slab, cracking may occur in the cast slab, and thus the upper limit of the N content is 0.01%. N is an inevitable impurity. As for the N content of steel, smaller is more preferable. However, when the N content is reduced to be less than 0.0010%, the refining cost increases, and thus the lower limit of the N content is 0.0010%. In a case where it is desirable to reduce the refining cost, it is preferable that the lower limit of the N content be 0.002%. In a case where it is necessary to further suppress generation of the nitride or coarsening, it is preferable that the upper limit of the N content be 0.008%, and more preferably be 0.006%.

Cr: 0.001 to 0.10%

Cr is an element that increases the stability of carbide during high-frequency heating. When the Cr content exceeds 0.10% due to the addition of Cr into steel, the stability of the carbide greatly increases, dissolution of the carbide is suppressed during high-frequency heating, and the hardenability decreases. Therefore, the upper limit of the Cr content is 0.10%. As the Cr content in the steel is decreased, the high-frequency hardenability increases. However, when the Cr content is reduced to 0.001% or less, the refining cost greatly increases, and thus the lower limit of the Cr content is 0.001%. In a case where it is preferable to further increase the dissolution rate of the carbide during the high-frequency heating, it is preferable that the upper limit of the Cr content be 0.080%, and more preferably be 0.070%. In addition, in a case of further reducing the refining cost, it is preferable that the lower limit of the Cr content be 0.010%.

To strengthen mechanical properties of the steel sheet, one or more of Ni, Cu, and Mo may be added into the steel in the required amount.

Ni: 0.01 to 0.5%

Ni is an element that is effective for improving toughness and the hardenability. When the Ni content is less than 0.01%, this addition effect may not be obtained, and thus the lower limit of the Ni content is 0.01%. When the Ni content exceeds 0.5%, the effect is saturated, and the cost increases, and thus the upper limit of the Ni content is 0.5%. From the viewpoints of strength, it is preferable that the lower limit of the Ni content be 0.05%. In addition, from the viewpoint of the cost, it is preferable that the upper limit of the Ni content be 0.3%, more preferably be 0.2%, and still more preferably be 0.15%.

Cu: 0.05 to 0.5%

Cu is an element that is effective for securing hardenability. When the Cu content is less than 0.05%, this addition effect is not demonstrate sufficiently, and thus the lower limit of the Cu content is 0.05%. When the Cu content exceeds 0.5%, stiffness excessively increases, and cold workability deteriorates, and thus the upper limit of the Cu content is 0.5%. From the viewpoint of strength, it is preferable that the lower limit of the Cu content be 0.08%. In addition, from the viewpoint of workability, it is preferable that the upper limit of the Cu content be 0.3%, more preferably be 0.2%, and still more preferably be 0.15%.

Mo: 0.01 to 0.5%

Mo is an element that is effective for improving the hardenability. When the Mo content is less than 0.01%, this addition effect decreases, and thus the lower limit of the Mo content is 0.01%. When the Mo content exceeds 0.5%, Mo-based carbide precipitates much in the steel. Since the Mo-based carbide is not sufficiently dissolved in the high-frequency quenching, the hardenability of a material deteriorates, and thus the upper limit of the Mo content is 0.5%. In a case where a relatively higher hardenability is necessary, it is preferable that the upper limit of the Mo content be 0.3%, and more preferably be 0.1%.

To further strengthen the mechanical properties of the steel sheet, one or more of Nb, V, Ta, B, and W may be added into the steel in a required amount.

Nb: 0.01 to 0.5%

Nb is an element that forms a carbonitride and is effective for preventing coarsening of a crystal grain and for improving toughness. When the Nb content is less than 0.01%, this addition effect is not sufficiently exhibited, and thus the lower limit of the Nb content is 0.01%. When the Nb content exceeds 0.5%, the addition effect is saturated, and thus the upper limit of the Nb content is 0.5%. To effectively use the addition effect, it is preferable that the Nb content be 0.07 to 0.4%. According to necessity, the lower limit of the Nb content may be limited to 0.09% or 0.14%, and the upper limit thereof may be limited to 0.35% or 0.3%.

Ti: 0.001 to 0.05%

Ti is added into the steel from the viewpoint of fixation of N and contributes to suppression of embrittlement of cast slab and stabilization of a material quality. When Ti is added into the steel and the Ti content exceeds 0.05%, this effect is saturated, and when the Ti content is 0.001% or less, this effect may not be obtained. Therefore, the range of the TI content is 0.001 to 0.05%. To effectively use the above-described effect, it is preferable that the upper limit of the Ti content be 0.20%, more preferably be 0.10%, and still more preferably be 0.06%.

V: 0.01 to 0.5%

Similarly to Nb, V is an element that forms a carbonitride and is effective for preventing coarsening of a crystal grain and for improving toughness. When the V content is less than 0.01%, this addition effect is small, and thus the lower limit of the V content is 0.01%. When the V content exceeds 0.5%, carbide is generated, and the quenching hardness decreases, and thus the upper limit of the V content is 0.5%. To effectively use the above-described effect, it is preferable that the V content be 0.07 to 0.2%.

Ta: 0.01 to 0.5%

Similarly to Nb and V, Ta is an element that forms a carbonitride and is effective for preventing coarsening of a crystal grain and for improving toughness. When the Ta content is less than 0.01%, this addition effect is not sufficiently exhibited, and thus the lower limit of the Ta content is 0.01%. When the Ta content exceeds 0.5%, carbide is generated, and the quenching hardness decreases, and thus the upper limit of the Ta content is 0.5%. To effectively use the above-described effect, it is preferable that the Ta content be 0.07 to 0.2%.

B: 0.001 to 0.01%

B is an element that is effective for improving the hardenability by addition of an extremely small amount. When the B content is less than 0.001%, this addition effect is not obtained, and thus the lower limit of the B content is 0.001%. When the B content exceeds 0.01%, castability decreases, a B-based compound is generated, and toughness decreases. Therefore, the upper limit of the B content is 0.01%. In a case where relatively higher hardenability is necessary, it is preferable that the lower limit of the B content be 0.003%. In addition, in a case where it is necessary to suppress generation of the B-based compound, it is preferable that the upper limit of the B content be 0.007%, and more preferably be 0.005%.

W: 0.01 to 0.5%

W is an element that is effective for strengthening of the steel sheet. When the W content is less than 0.01%, this addition effect is not exhibited, and thus the lower limit of the W content is 0.01%. When the W content exceeds 0.5%, workability decreases, and thus the upper limit of the W content is 0.5%. From the viewpoint of strength, it is preferable that the lower limit of the W content be 0.04%. From the viewpoint of workability, it is preferable that the upper limit of the W content be 0.2%.

In a case of using scrap as a raw material of the steel sheet, one or more of Sn, Sb, and As may be unavoidably mixed into the steel. However, when the content thereof is 0.03% or less, the high-frequency hardenability and the hardenability do not deteriorate. Accordingly, one or more of Sn: 0.03% less, Sb: 0.03% or less, and As: 0.03% or less may be contained in the steel. Commonly, these chemical compositions are contained as impurities in a content of 0.003% or more, respectively. However, it is preferable that the amount of these chemical compositions is small.

The O content in the steel sheet is not defined. However, when oxides aggregate and coarsen, the cold workability decreases, and thus the O content is preferably 0.0025% or less. As for the O content, less is more preferable. However, it is technically difficult to reduce the content of O that is unavoidably contained therein to be less than 0.0001%, and thus 0.0001% or more of O may be contained therein.

In a case of using the scrap as an ingot material of the steel sheet, elements such as Zn and Zr are mixed in as an inevitable impurities, but the above-described element may be mixed into the steel within a range which does not deteriorate the properties of the steel sheet. In addition, elements other than Zn and Zr may be mixed into the steel within a range not deteriorating the properties of the steel sheet.

As described above, both Cr and Mo suppress the supply (solid solution) of C from carbide to a parent phase at a high temperature, and decrease hardenability. That is, Cr is solid-soluted in cementite, and suppresses the solid solution of C from the cementite to the parent phase during high-frequency heating, and thus decreases hardenability. In addition, when being excessively contained in the steel, Mo forms Mo-based carbide. In this case, a solid solution of C from the Mo-based carbide to the parent phase is suppressed during the high-frequency heating, and thus hardenability decreases. Therefore, in a case where Cr and Mo are contained in the steel, it is preferable that the Cr content [Cr] and the Mo content [Mo] satisfy the following Expression (1).

$$[Cr]+[Mo]/10<0.10 \tag{1}$$

As described above, the medium carbon steel sheet of this embodiment has a chemical composition that contains the above-described basic elements, the remainder being Fe and inevitable impurities, or a chemical composition that contains the above-described basic elements and at least one selected from the selective elements, the balance composed of Fe and inevitable impurities.

Furthermore, in this embodiment, it is necessary to control the shape of the carbide in addition to the above-described chemical composition. Hereinafter, the shape of the carbide will be described in detail.

Specifically, the average diameter of the carbide is 0.6 μm or less, the spheroidizing ratio of the carbide is equal to or more than 70% and less than 90%, and the average diameter d (μm) of the carbide and the spheroidizing ratio p (%) of the carbide satisfy the following Expression (2).

$$d \leq 0.04 \times p - 2.6 \tag{2}$$

It is preferable to use a scanning electron microscope for the observation of a structure (carbide). Four or more sites of visual fields (regions), in which 500 or more carbides are contained on a structure observation surface at a magnification of 3,000 times, are selected, and an area of each carbide contained in the regions is measured. Here, carbide having the area of 0.01 μm² or less is excluded from an object to be evaluated to suppress an effect of a measurement error due to a noise. The diameter (equivalent circle diameter), which is obtained by approximating an average area (an average value of the area) of the carbide that was measure to a circle, is defined as an average diameter (average carbide diameter). Carbide in which the ratio of the long axial length to the short axial length (aspect ratio) of each carbide is 3 or more is defined as acicular carbide, and carbide in which the ratio is equal to or more than 1 and less than 3 is defined as spherical carbide. In addition, a value, which is obtained by dividing the number of the spherical carbides by the number of total carbides, is defined as the spheroidizing ratio of the carbide.

It is necessary for the average diameter of the carbide to be set to 0.6 μm or less. Since it takes long time to complete dissolution of coarse carbide, there is a tendency for the hardenability to deteriorate. Particularly, in a case where the average diameter of the carbide is larger than 0.6 μm, the quenching hardenability during high-frequency quenching at an average heating rate of 100° C./second decreases. In addition, it is preferable that the average diameter of the carbide be controlled to be 0.55 μm or less according to conditions of the high-frequency quenching and the chemical composition, and more preferably 0.5 μm or less. In addition, in the above-described measurement method, the average diameter of the carbide having an area exceeding 0.01 μm² may be set to a range exceeding 0.11 ($=0.2/\sqrt{\pi}$) μm and equal to or less than 0.6 μm.

The spheroidizing ratio of the carbide is equal to or more than 70% and less than 90%. There is a tendency for stress during cold working to be localized at the periphery of the acicular carbide, and there is a tendency for the periphery to acts as a starting point of cracking. Particularly, when the spheroidizing ratio is less than 70%, the cold workability deteriorates, and thus the spheroidizing ratio of the carbide is set to be 70% or more. In addition, in a case where relatively higher cold workability is necessary, it is preferable that the spheroidizing ratio of the carbide be 73% or more, and more preferably be 75% or more. On the other hand, in the spherical carbide, the surface area at which the steel and the parent phase come into contact with each other is smaller, and the emission and diffusion path of carbon from the carbide to the parent phase is narrower compared to the acicular carbide. Particularly, in a case where the spheroidizing ratio is 90% or more, the quenching hardenability in the high-frequency quenching at an average heating rate of 100° C./second is not sufficient. In addition, it is preferable that the spheroidizing ratio of the carbide be controlled to be less than 85% according to the conditions of the high-frequency quenching. In addition, in the above-described measurement method, the spheroidizing ratio of the carbide having an area exceeding 0.01 μm² may be set to a range equal to or more than 70% and less than 90%.

In addition to the above-described conditions (the average diameter and the spheroidizing ratio), it is necessary that the average diameter d (μm) of the carbide and the spheroidizing ratio p (%) of the carbide satisfy the above-described Expression (2). That is, when the spheroidizing ratio of the carbide is equal to or more than 70% and less than 80%, and the acicular carbide is rich, the absolute value of the long axial length of the acicular carbide has an effect on cold workability. Therefore, the relationship of Expression (2) is necessary between the spheroidizing ratio of the carbide and the average diameter of the carbide. Hereinafter, Expression (2) will be described.

The cold workability has a close relationship with the number of cracks during cold working. The larger the number of cracks is, the lower the cold workability is. It is considered that each crack during the cold working is generated from a void (atomic vacancy), which is generated due to entanglement of dislocation introduced by the working or cutting of the dislocation, as a nucleus. Therefore, it is possible to secure cold workability by suppressing the concentration of working strain.

When the carbide has the acicular shape, a dimensional difference between the short axial length and the long axial length is large, and stress is concentrated on ends (ends of the long axis) in a long axial direction of the acicular carbide, and thus a difference in stress between a stress field in the ends of the long axis and a stress field in the ends (ends of short axis) in a short axial direction increases. Dislocation (strain) is introduced to solve unevenness of this stress field. Therefore, it is considered that a number of voids are generated in the vicinity of the acicular carbide during the cold working, and the crack is generated. On the other hand, when the carbide has the spherical shape, the dimensional difference between the short axial length and the long axial length is small, and thus the unevenness of the stress field is less. Therefore, it is considered that the dislocation (strain) in the vicinity of the carbide is not likely to be localized, and thus generation of cracks is suppressed.

In addition, not only the aspect ratio of the carbide but also the absolute value of the long axial length of the acicular carbide has an effect on the stress concentration at the ends of the long axis. The larger the long axial length is, the more the stress concentration to the ends of the long axis increases. Therefore, there is a tendency for dislocations (strain) to occur. Accordingly, in a case where the spheroidizing ratio of the carbide is not high (in a case where the acicular carbide is rich), it is necessary to make the average diameter of the carbide small to secure cold workability. That is, in a case where the spheroidizing ratio of the carbide is equal to or more than 70% and less than 80%, it is necessary for the average diameter d (μm) of the carbide and the spheroidizing ratio p (%) of the carbide to satisfy the above-described Expression (2).

In this manner, the present inventors found that when appropriate predetermined conditions are satisfied with regard to the average diameter of the carbide and the spheroidizing ratio of the carbide, cold workability may be increased while securing high-frequency hardenability.

Furthermore, in this embodiment, in addition to the above-described chemical composition and the shape of the carbide, it is preferable to control the hardness before cold working.

When the hardness before the cold working is less than 170 HV, sufficient ductility may be obtained, and thus a sufficient amount of shaping may be secured during the working. To secure a relatively larger amount of shaping, it is preferable that the hardness before the cold working be less than 165 HV, more preferably be less than 160 HV, and still more preferably be less than 155 HV. When the steel sheet is soft, ductility is improved, and thus the steel sheet may also endure hard working, but there is a tendency for sagging to occur during punching working. Therefore, it is preferable that the hardness before the cold working be 120 HV or more. In recent years, a cold working technology in which punching, bending, and drawing working are combined has also spread, and thus it is preferable that the hardness before the cold working be appropriately controlled according to the combination of these manufacturing processes.

The technology, in which in addition to the chemical composition, the above-described predetermined conditions are satisfied with regard to the average diameter of the carbide and the spheroidizing ratio of the carbide so as to realize compatibility between the cold workability and the high-frequency hardenability of the steel sheet, is a new finding of the present inventors. The present inventors have also found that when the hardness before the cold working is controlled to be less than 170 ITV, the steel sheet may be appropriately used for cold working.

It is preferable that the quenching hardness after the high-frequency quenching be 500 HV or more. When the quenching hardness is 500 HV or more, abrasion resistance accompanying high-strength of quenched steel is improved. Particularly, in a member such as a clutch plate and a gear that are components of a vehicle, hardening of 500 HV or more is preferable to obtain abrasion resistance. When the quenching hardness is too high, toughness of a quenched portion greatly decreases, and thus a function as a member for a mechanical structure may be lost. Therefore, it is preferable that the quenching hardness after the high-frequency quenching be 900 HV or less, more preferably be 800 HV or less, and still more preferably be 750 HV or less.

Here, to define a standard of the quenching hardness that is necessary for a part, high-frequency quenching is performed in such a manner that heating is performed from room temperature to 1,000° C. at an average heating rate of 100° C./second, holding is carried out for 10 seconds, and quick cooling to room temperature is immediately carried out at an average cooling rate of 200° C./second or more. Specifically, the test conditions of the high-frequency quenching in the present invention are as follows. The temperature is raised from room temperature to 1,000±20° C. at an average heating rate set to 100±15° C./second in a temperature range of 750° C. or higher, holding at 1,000±20° C. is carried out for 10±0.5 seconds, and quick cooling is performed to room temperature at an average cooling rate set to 200±10° C. between 800° C. and 400° C. A steel sheet, which has a Vickers hardness of 500 or more (that is, 500 HV or more) after the high-frequency quenching under these conditions, is a target of the present invention.

In addition, although the sheet thickness is not particularly limited, it is preferable that the sheet thickness of the steel sheet be 20 mm or less or 16 mm or less, more preferably be 14 mm or less, still more preferably be 12 mm or less or 9 mm or less from the viewpoint of workability. In addition, from the viewpoint of strength, it is preferable that the sheet thickness be 1 mm or more or 2 mm or more, more preferably 2.5 mm or more, and still more preferably be 3 mm or more.

Furthermore, an important concept of the steel sheet of this embodiment will be described referring to FIGS. 1 to 5.

FIG. 1 shows an effect of the average diameter of the carbide and the spheroidizing ratio of the carbide on the quenching hardness and the cold workability. In addition, the cold workability is evaluated by a flat-sheet bending test using a test specimen (flat-sheet bending test specimen) having a width of 30 mm and a length of 100 mm. In this bending test, compression stress and tensile stress are applied to an inner surface (inner circumferential surface) and an outer surface (outer circumferential surface) of the bended sample (flat-sheet bending sample), respectively, and thus workability due to the compression stress and workability due to the tensile stress can be simultaneously measured by evaluating cracks on an inner surface side and on an outer surface side of the sample. In the present invention, the bending radius is set to 1/2 times the sheet thickness, and the bending angle is set to 90°. As shown in FIG. 1, in a steel sheet in which the average diameter d of the carbide is 0.6 μm or less, the spheroidizing ratio p of the carbide is equal to or more than 70% and less than 90%, and the average diameter d (μm) of the carbide and the spheroidizing ratio p (%) of the carbide satisfy the above-described Expression (2) (a white circle in FIG. 1), a quenching hardness of 500 HV or more is obtained after the high-frequency quenching, and cracking does not occur during working. Conversely, in a steel sheet in which the spheroidizing ratio of the carbide is equal to or more than 70% and less than 80%, and the average diameter d (μm) of the carbide and the spheroidizing ratio p (%) of the carbide do not satisfy the above-described Expression (2) (a black square in FIG. 1), or a steel sheet in which the spheroidizing ratio of the carbide is less than 70% (a black square in FIG. 1), the percentage of the carbide that acts as a starting point of fracture increases, and thus cracking occurs during the working. In addition, in a steel sheet in which the average diameter of the carbide exceeds 0.6 μm, and the spheroidizing ratio of the carbide is equal to or more than 80% and less than 90% (a black triangle in FIG. 1) or a steel sheet in which the spheroidizing ratio of the carbide is 90% or more (a black triangle in FIG. 1), the quenching hardness is not sufficient.

Here, as long as not particularly stated additionally, the quenching hardness that is used as a standard is defined as hardness measured by the following conditions. Specifically, the high-frequency quenching is performed in such a manner that a sample is heated from room temperature to 1,000° C. at a frequency of 78 kHz at an average heating rate of 100° C./second, the sample is held for 10 seconds, and then the sample is quickly cooled to room temperature at an average cooling rate of 200° C./second or more, and then Vickers hardness is measured. The Vickers hardness after the high-frequency quenching is the quenching hardness of this embodiment. As the spheroidizing ratio decreases, it is easy for the carbide to be dissolve. Therefore, there is a tendency for the quenching hardness to increase. Similarly, as the average diameter of the carbide decreases, it is easy for the carbide to be dissolved. Therefore, there is a tendency for the quenching hardness to increase. On the other hand, as the spheroidizing ratio increases, the workability increases. As described above, when the shape of the carbide is controlled, the workability and the quenching hardenability, which are contrary to each other, may be compatible with each other.

Figure 2:
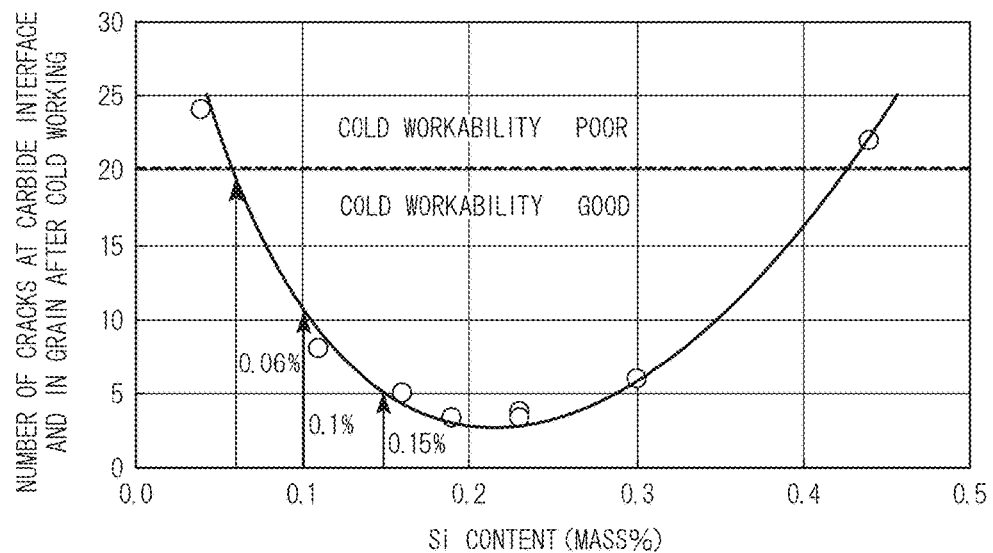
FIG. 2 is a diagram illustrating a relationship between the Si content and the number of cracks at a carbide interface and in a grain after cold working.

FIG. 2 shows a relationship between the Si content and the cold workability (the number of cracks at a carbide interface and in a grain after the cold working). The number of cracks at regions of ⅛ to ⅜ and ⅝ to ⅞ of the sheet thickness in a sheet thickness cross-section (cross-section including a sheet thickness direction and a longitudinal direction) of the flat-sheet bending sample is measured by a scanning electron microscope at a magnification of 3,000 times. In a case where the number of cracks is within 20 per 1 mm², it may be determined that occurrence of cracks caused by interfacial peeling during the cold working is suppressed, and thus the cold workability is evaluated as "good". In addition, in a case where the number of cracks exceeds 20, the cold workability is evaluated as "poor". As shown in FIG. 2, in a steel sheet in which the Si content is 0.06% or more, the cold workability is good. Furthermore, until the Si content reaches 0.3%, the Si content increases and the number of cracks decreases. In this case, the cracks are generated due to peeling at an interface between ferrite and carbide. Furthermore, when the Si content exceeds 0.3%, the Si content increases, and the number of cracks increases. In this case, cracks are generated in a ferrite phase. In addition, when the Si content increases and is 0.06 to 0.1%, a rate which the number of cracks are decreased is large, and the cold workability is largely improved. Furthermore, when the Si content is 0.15 to 0.26%, the effect of improving the cold workability due to Si is maximally obtained. In addition, in FIG. 2, after a sample in which the C content is 0.40 to 0.45% is annealed at 680° C. for 30 hours, evaluation of the cold workability to be described later is performed.

Figure 3:
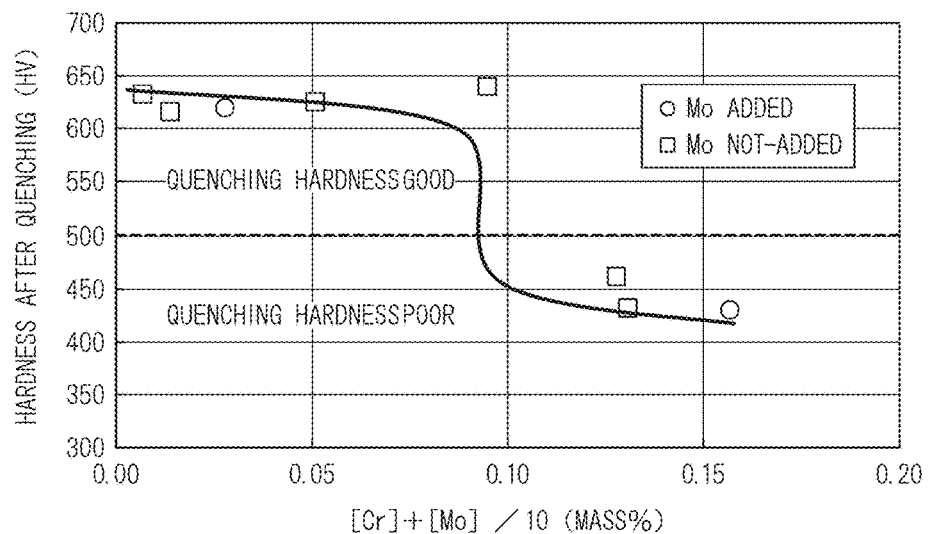
FIG. 3 is a diagram illustrating a relationship between [Cr]+[Mo]/10 and quenching hardness.

FIG. 3 shows a relationship between [Cr]+[Mo]/10 and the quenching hardness. As shown in FIG. 3, when [Cr]+[Mo]/10 is less than 0.10, the quenching hardness is further improved. Therefore, it is preferable that [Cr]+[Mo]/10 be less than 0.10. In addition, in FIG. 3, after the sample in which the C content is 0.40 to 0.45% is annealed at 680° C. for 30 hours, the above-described high-frequency quenching is performed, and then the quenching hardness is measured.

Figure 4:
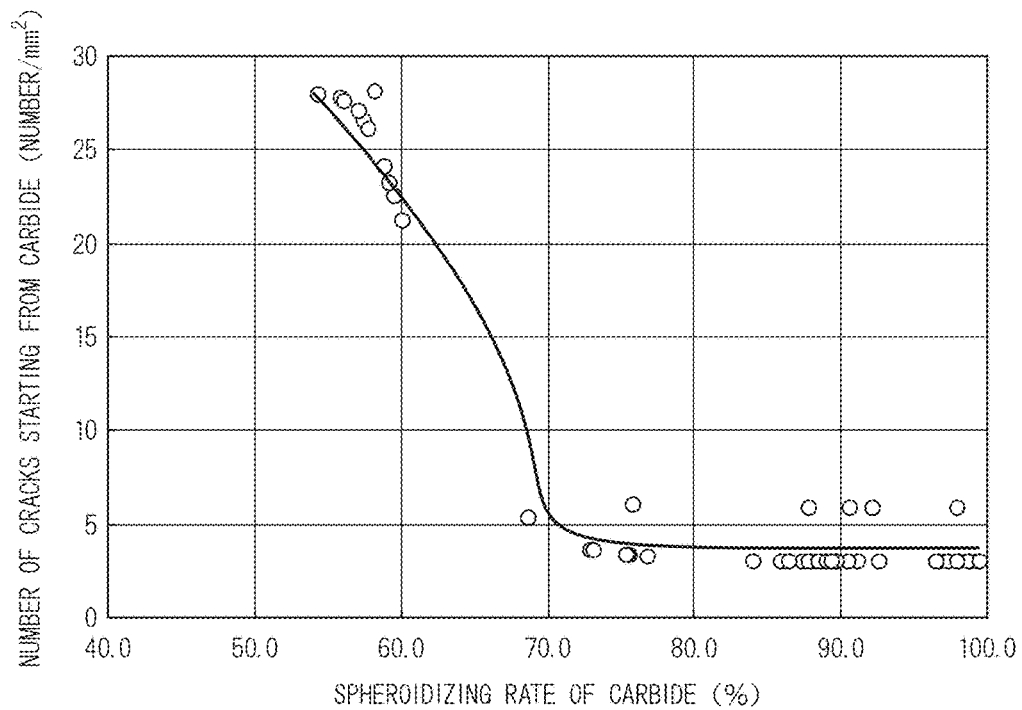
FIG. 4 is a diagram illustrating a relationship between the spheroidizing ratio of carbide and the number of cracks starting from the carbide.

FIG. 4 shows a relationship between the spheroidizing ratio of the carbide and the number of cracks that are generated from the carbide as a starting point (cracks starting from the carbide) during the cold working. As can be seen from FIG. 4, when the spheroidizing ratio of the carbide is less than 70%, the number of cracks rapidly increases.

In addition, FIG. 5 shows a relationship between the S content and the number of cracks starting from sulfide during the cold working. As can be seen from FIG. 5, when the S content is less than 0.0075%, the number of cracks starting from the sulfide greatly decreases.

In addition, an energy dispersion X-ray spectroscope (EDS) that is attached to a scanning electron microscope is used to determine the cracks caused by the sulfide and the cracks caused by the carbide.

Next, a method for manufacturing the medium carbon steel sheet for cold working according to an embodiment of the present invention (hereinafter, referred to as "a manufacturing method of this embodiment") will be described. The manufacturing method of this embodiment has a technical idea of combining high-temperature coiling and low-temperature annealing, and a specific example thereof is shown below. In addition, the manufacturing method to be shown below is an example, and other manufacturing method may be adapted as long as a necessary structure may be obtained.

First, continuous casting slab (cast slab) having a chemical composition of the above embodiment is heated. The heating temperature is set to 1,050 to 1,300° C. In addition, to suppress decarbonization and nitrogen absorption during heating, it is preferable that the soaking time be 150 minutes or less, and more preferably be 90 minutes or less. Here, the soaking time represents the time taken from a time at which a surface temperature of the cast slab reaches a temperature lower than a target heating temperature by 20° C. to a time at which the cast slab is taken out from a heating furnace. When the heating temperature exceeds 1,300° C. or the soaking time is excessively long, decarbonization at a surface layer portion of the slab becomes significant during the heating process, and thus hardenability of the surface of the steel sheet deteriorates. In addition, when the cast slab is heated at 1,050° C. or higher, a structure of an approximately austenite single phase may be obtained. From the viewpoint of suppressing decarbonization, it is preferable that the heating temperature be 1,280° C. or lower, more preferably be 1,240° C. or lower, and still more preferably be 1,200° C. or lower. Similarly, it is preferable that the soaking time be 60 minutes or less. In addition, the lower limit of the soaking time is not particularly limited.

In addition, the continuous casting slab may be directly provided to hot rolling, or the continuous cast slab may be reheated after being cooled and may then be provided to the hot rolling. A difference in properties of a steel sheet hardly occurs between the former and the latter.

As the hot rolling, any common hot rolling or continuous hot rolling in which slab is joined at finish rolling may be adapted. The termination temperature of the hot rolling (hot-rolling termination temperature) is determined from the viewpoints of productivity, accuracy of sheet thickness, improvement of anisotropy, and suppression of a surface defect. When the hot-rolling termination temperature is lower than 750° C., lots of surface defects occur due to seizure during finish rolling. In addition, when the hot-rolling termination temperature is higher than 1,000° C., the occurrence frequency of the defects caused by scale increases, and thus a yield ratio decreases, and the cost increases. Therefore, the hot-rolling termination temperature is set to 750 to 1,000° C.

Furthermore, the steel sheet after the hot rolling (finish rolling) is cooled down to a cooling temperature (first cooling termination temperature) of 500 to 700° C. at an average cooling rate (a first average cooling rate) of 20 to 50° C./second immediately after the hot rolling. In this case, a lamella spacing of pearlite that is generated in the steel sheet is decreased while limiting generation and growth of pro-eutectoid ferrite, and thus the carbide in the steel sheet after annealing may be made fine. When the average cooling rate from the hot-rolling termination temperature to the cooling temperature (the first cooling termination temperature) is 20° C. or lower, since the generation and growth of the pro-eutectoid ferrite are not limited, a pearlite band caused by segregation may be generated. Therefore, there is a tendency for coarse carbide to be generated after annealing, and thus hardenability may decrease. In addition, when the average cooling rate is 50° C./second or more, it is difficult to control the temperature of the steel sheet. Furthermore, the pearlite, which is necessary to secure cementite having the above-described spheroidizing ratio, is not sufficiently generated. As described above, the above-described cooling temperature is controlled to 500 to 700° C. in consideration of a transformation initiation temperature and a transformation termination temperature of pearlite to appropriately perform a structure control of the pearlite.

Then, the steel sheet is cooled to a coiling temperature (a second cooling termination temperature) that is equal to or higher than 400° C. and lower than the first cooling termination temperature by at least 50° C. (that is, a temperature at which a difference between the first cooling termination temperature and the second cooling termination temperature is 50° C. or higher, and which is equal to or lower than a temperature that is lower than the first cooling termination temperature by 50° C. at an average cooling rate (a second average cooling rate) of 5 to 30° C./second, and then the steel sheet is wound. In this case, the lamella spacing of the pearlite that is generated in the steel sheet may be reduced while securing the amount of pearlite in the steel sheet, and thus the carbide in the steel sheet after annealing may be made fine. In a case where the steel sheet is wound at a temperature range from the first cooling termination temperature to a temperature that is lower than the first cooling termination temperature by 50° C.), pearlite having a rough lamella spacing is generated, and it is difficult for the carbide after the annealing to be spheroidized, and thus cold workability deteriorates. Therefore, the coiling is performed at a temperature that is lower than the first cooling termination temperature by at least 50° C.). In addition, when the average cooling rate in a range from the above-described cooling temperature to the coiling temperature is 5° C./second or less, a pearlite band caused by segregation may be generated, or the lamella spacing of pearlite may greatly increase. Therefore, there is a tendency for coarse carbide to be generated after annealing, and the hardenability of the steel sheet may decrease. In addition, when the average cooling rate is 30° C./second or more, the pearlite, which is necessary to secure cementite having the above-described spheroidizing ratio, is not sufficiently generated.

In addition, as described above, the steel sheet after the cooling is wound at the coiling temperature which is from 400° C. to a temperature that is lower than the first cooling termination temperature by at least 50° C. When the coiling temperature is lower than 400° C., partial martensite transformation occurs, and the strength of the steel sheet increases, and thus handling may be difficult. In addition, a microstructure becomes non-uniform, and gauge hunting occurs during cold rolling, and thus a yield ratio may decrease. On the other hand, when the coiling is performed at a temperature higher than a temperature lower than the first cooling termination temperature by 50° C., as described above, pearlite having a rough lamella spacing is generated, and the spheroidizing ratio after annealing decreases, and thus cold workability deteriorates.

Furthermore, the steel sheet is held at a temperature in a range of 400° C. to the second cooling termination temperature in such a manner that a time for which a wound steel sheet (coil) is held at 400° C. or higher is limited to 30 hours or less. Then, the steel sheet is cooled to a temperature of 400° C. or lower (for example, room temperature, or a temperature at which acid washing is possible). Here, in a case of performing the holding and the cooling as the same process, the time at which the steel sheet is held at 400° C. or higher during the cooling, is limited to 30 hours or less. In this case, decarbonization is suppressed, and thus the C content on a surface may be sufficiently secured. When the time for which the steel sheet is held at 400° C. or higher exceeds 30 hours, an oxygen source (for example, air) and carbon react with each other on the surface of the steel sheet, and it is difficult to secure the carbon content on the surface of the steel sheet, which is necessary for the high-frequency quenching.

The cooled steel sheet is performed pickling to clean the surface, and then the steel sheet is subjected to softening annealing. In this embodiment, the steel sheet is subjected to the softening box annealing to improve the workability of the steel sheet.

In the softening annealing (annealing), the steel sheet is heated from room temperature to an annealing temperature of 600° C. to $A_{c1}$-10° C., and then the steel sheet is held for a time equal to more than 5 hours and less than 100 hours. By holding for a time equal to or more than 5 hours and less than 100 hours, the steel sheet is annealed in such a manner that a ferrite grain is coarsened, and the steel sheet becomes soft, and the spheroidizing ratio of the carbide is not too high. When the annealing temperature is $A_{c1}$-10° C. or higher (particularly, $A_{c1}$° C. or higher), since the carbide is rapidly spheroidized, the hardenability during subsequent high-frequency quenching decreases. On the other hand, when the annealing temperature is 600° C. to $A_{c1}$-10° C., the diffusion rate of elements in the steel sheet (particularly, C) is optimized, and thus the spheroidizing ratio of the carbide may be appropriately controlled.

In the above-described box annealing, it is preferable that the hydrogen concentration is 95% or more, the dew point at 400° C. or lower is less than −20° C., and the dew point at a temperature higher than 400° C. is less than −40° C.

When the annealing is performed in an atmosphere in which the hydrogen concentration is 95% or more, the temperature distribution in the coil may be controlled in a relatively uniform manner, and in addition to this, a decrease in hardenability due to intrusion of nitrogen may be suppressed. In addition, when the dew point at 400° C. or lower is controlled to be less than −20° C., and the dew point at a temperature higher than 400° C. is controlled to be less than −40° C., decarbonization during the annealing may be sufficiently suppressed.

Figure 8:
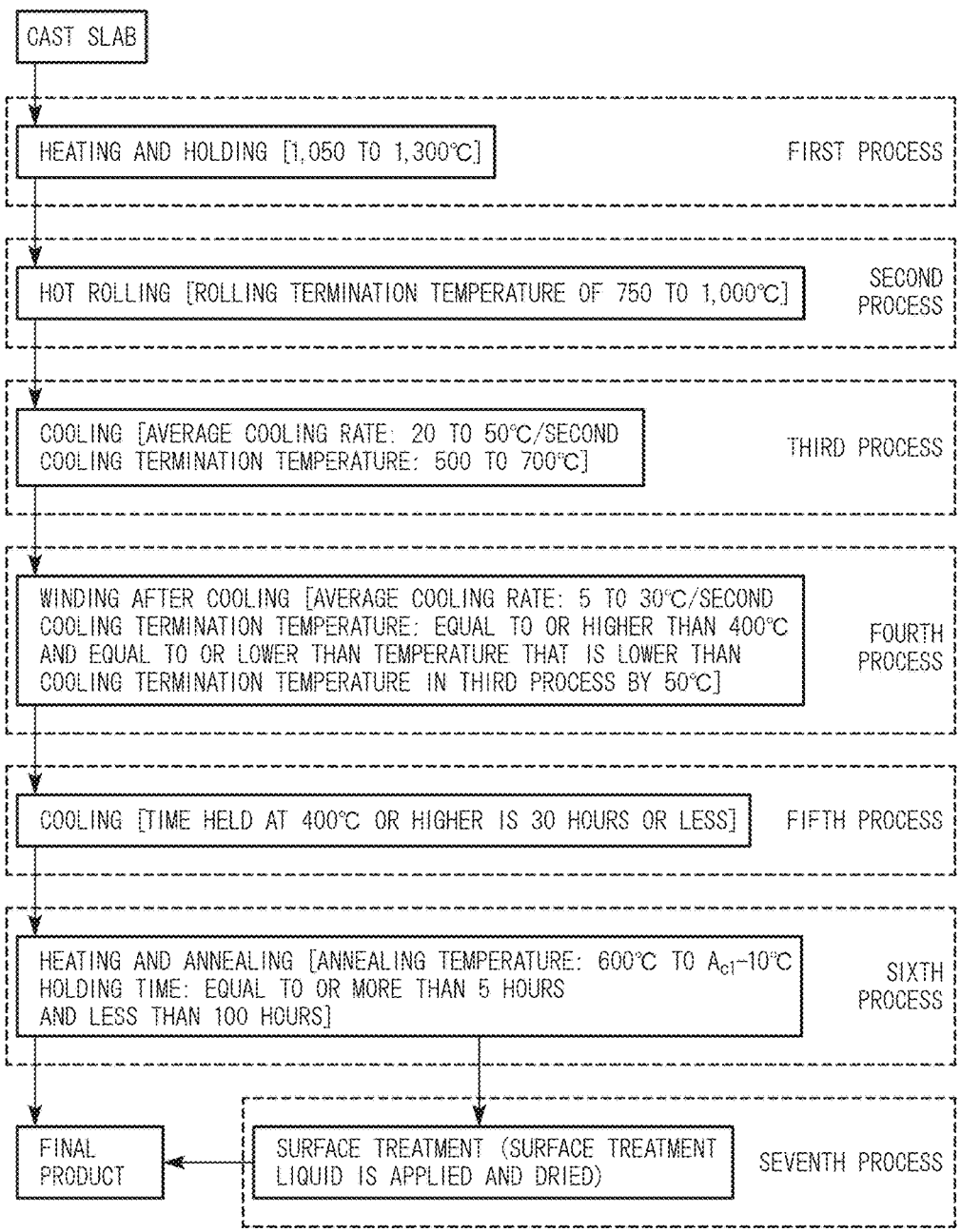
FIG. 8 is a flowchart schematically illustrating an outline of a method of manufacturing the medium carbon steel sheet for cold working of the present invention.

With regard to other treatments, there is no particular limitation thereto as long as the shape of the carbide satisfies the conditions of the steel sheet of the above-described embodiment. For example, cold rolling and subsequent softening annealing may be performed. Here, for the easy understanding, FIG. 8 shows a flowchart schematically illustrating an outline of a method of manufacturing the steel sheet for cold working of the present invention, which includes this embodiment and the following modified examples.

In addition, a surface treatment film may be formed on a surface of the steel sheet of the above-described embodiment from a viewpoint of lubricity to further improve the cold workability. For example, as a modified example of the steel sheet of the above-described embodiment, it is preferable to form the following surface treatment film on the surface of the steel sheet of the above-described embodiment.

In this modified example, a gradient-type surface treatment film including an adhesion layer that secures adhesiveness with the steel sheet that is a base material, a base layer that supports a lubricant, and a lubricant layer that improves lubricity is provided on the surface of the steel sheet, and the thickness of each layer is controlled. Accordingly, a surface treatment film, which is very suitable from the viewpoint of global environment conservation, may be formed on the surface of the steel sheet with a simple treatment process. In addition, lubricity, a seizure prevention performance, and a galling prevention performance that are excellent may be given to the steel sheet.

Hereinafter, a steel sheet for cold working (steel sheet) according to this modified example will be described in detail while referring to FIG. 6.

In addition, in the present specification and the above drawings, like reference numerals will be given to like parts having substantially same functions, and redundant description thereof will be omitted here.

[Configuration of Steel Sheet According to this Modified Example]

First, a configuration of a steel sheet (hereinafter, referred to as a "surface treated steel sheet") according to this modified example will be described while referring to FIG. 6. FIG. 6 shows a longitudinal cross-sectional diagram schematically illustrating a configuration of the surface treated steel sheet.

Figure 6:
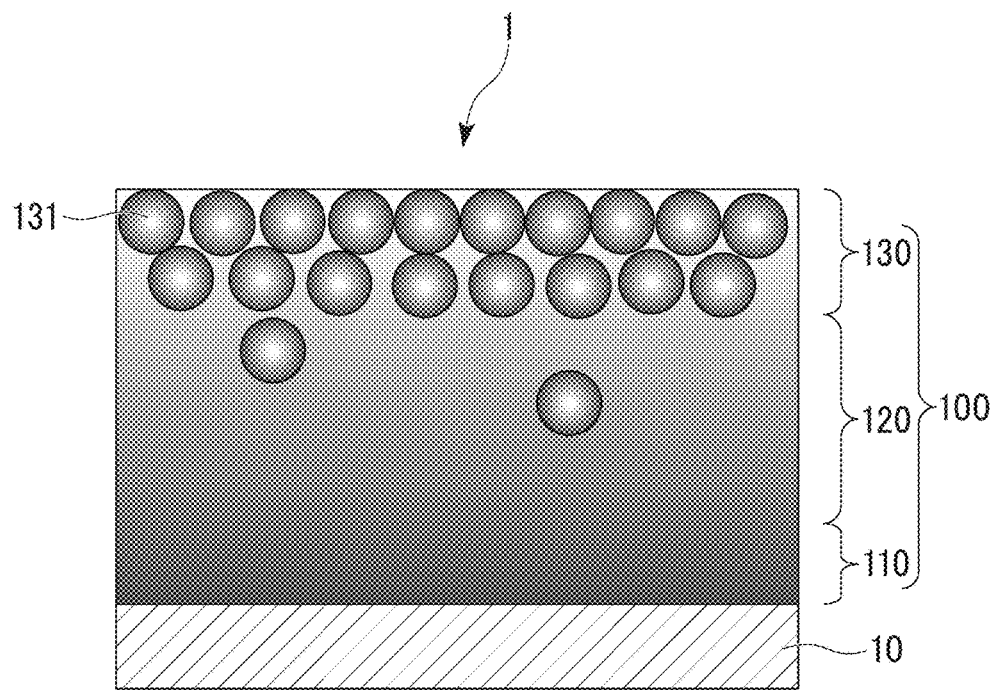
FIG. 6 is a longitudinal cross-section diagram schematically illustrating a configuration of a steel sheet for cold working, which is according to a modified example of an embodiment of the present invention.

As shown in FIG. 6, a surface treated steel sheet 1 includes a steel sheet 10 that is a base material, and a surface treatment film (film) 100 that is formed on at least one surface of the steel sheet 10.

(Steel Sheet 10)

As the steel sheet 10 that is a base material of the surface treated steel sheet 1, the steel sheet of the above-described embodiment may be used as is. However, the steel sheet of the above-described embodiment may be subject to plating. For example, the steel sheet of the above-described embodiment may be subjected to plating using one or more metals of zinc, nickel, iron, aluminum, titanium, magnesium, chrome, manganese, and tin.

(Surface Treatment Film 100)

In the surface treatment film 100, each chemical composition in the film has a concentration gradient in a film thickness direction. Therefore, the surface treatment film 100 that is a gradient-type film may be divided into three layers. That is, in the surface treatment film 100, three layers including an adhesion layer 110, a base layer 120, and a lubricant layer 130 are formed in this order from an interface between the surface treatment film 100 and the steel sheet 10 toward a surface of the surface treatment film 100.

Here, the "gradient-type" in this modified example represents that the chemical compositions that are contained in the surface treatment film 100 have a concentration gradient in the film thickness direction of the film as described above. That is, main chemical compositions in the surface treatment film 100 include a chemical composition that is derived from a silanol bond (details thereof will be described later) formed between the film and a metal on the surface of the steel sheet 10 that is a base material, a heat resistant resin, an inorganic acid salt, and a lubricant. These chemical compositions have the concentration gradient in the film thickness direction of the surface treatment film 100. More specifically, the concentration of a lubricant 131 increases from the interface between the surface treatment film 100 and the steel sheet 10 toward the surface of the surface treatment film 100. Conversely, a concentration of each of the heat resistant resin and the inorganic acid salt decreases. In addition, as it closes to the interface between the surface treatment film 100 and the steel sheet 10, the chemical composition derived from the silanol bond increases. Accordingly, it does not mean that the adhesion layer 110, the base layer 120, and the lubricant layer 130, which are included in the surface treatment film 100, are completely separated from each other and form three layers (a chemical composition in an arbitrary layer that is not present in another layer).

Hereinafter, a configuration of each layer configuring the surface treatment film 100 will be described in detail.

<Adhesion Layer 110>

The adhesion layer 110 secures adhesiveness during the cold working between the surface treatment film 100 and the steel sheet 10 that is a base material, and has a function of preventing seizure between the surface treated steel sheet 1 and a mold. Specifically, the adhesion layer 110 is located at a side close to the interface between the surface treatment film 100 and the steel sheet 10, and contains the largest amount of a chemical composition derived from the silanol bond among the three layers configuring the surface treatment film 100.

Here, the silanol bond in this modified example is expressed by Si—O—X (X represents a metal that is a constituent chemical composition of the steel sheet (base material)), and is formed in the vicinity of the interface between the surface treatment film 100 and the steel sheet 10. It is assumed that this silanol bond corresponds to a covalent bond between a silane coupling agent contained in a surface treatment liquid that forms the surface treatment film 100, and an oxide of a metal (for example, in a case where the steel sheet 10 is subjected to plating, metal species (Zn, Al, and the like) contained in a plating material, and in a case where the steel sheet 10 is not subjected to the plating, Fe) on the surface of the steel sheet 10. In addition, whether or not the silanol bond is present may be confirmed by a method capable of performing element analysis in a depth direction of a sample (for example, whether or not the silanol bond is present may be confirmed by determining the quantity of each element from a spectrum intensity of chemical composition (Si, X, O) element derived from the silanol bond in the film thickness direction of the surface treatment film 100 using a high-frequency glow discharge emission spectrometric analyzer (high-frequency GDS). In addition, whether or not the silanol bond is present may be confirmed by directly observing a cross-section of the sample (for example, an observation method using a field emission-type transmission electron microscope (FE-TEM)) and by an elementary analysis of a micro part (for example, an analysis method using an energy-dispersive X-ray spectroscope (EDS)).

In addition, it is necessary for the adhesion layer 110 to have a thickness of 0.1 nm to 100 nm. When the thickness of the adhesion layer 110 is less than 0.1 nm, the formation of the silanol bond is not sufficient, and thus sufficient adhesivity between the surface treatment film 100 and the steel sheet 10 may not be obtained. On the other hand, when the thickness of the adhesion layer 110 exceeds 100 nm, the number of the silanol bonds becomes excessive, and internal stress inside the adhesion layer 110 increases during the working of the surface treated steel sheet 1, and thus the film becomes brittle. As a result, the adhesivity between the surface treatment film 100 and the steel sheet 10 decreases. From the viewpoint of further reliably securing the adhesivity between the surface treatment film 100 and the steel sheet 10, it is preferable that the thickness of the adhesion layer 110 be 0.5 to 50 nm.

<Base Layer 120>

The base layer 120 improves steel-sheet follow-up properties during the cold working, and gives hardness and strength against the seizure with the mold to the surface treated steel sheet 1. In addition, the base layer 120 supports the lubricant 131 and the lubricant layer 130. Specifically, the base layer 120 is positioned between the adhesion layer 110 and the lubricant layer 130 as an intermediate layer, and contains the largest amount of the heat resistant resin and the inorganic acid salt among the three layers configuring the surface treatment film 100.

When the inorganic acid salt is selected as a chemical composition contained in the base layer 120, the film having the gradient-type three-layer structure similar to this modified example may be formed, and the above-described function of the base layer 120 may be sufficiently carried out. In addition, in this modified example, since the surface treatment film 100 is formed using a water-based surface treatment liquid, it is preferable that the inorganic acid salt in this modified example be water-soluble in consideration of stability of the surface treatment liquid. However, even when the inorganic acid salt is a salt that is insoluble or poorly soluble in water, for example, in a case of a salt that is soluble in an acid, it is not necessary to consider the stability of the surface treatment liquid. When an inorganic acid salt that is soluble in water (zinc nitrate) and an acid (for example, phosphoric acid) are used in combination, a film containing a salt that is insoluble or poorly soluble in water (for example, zinc phosphate) may be formed.

From the above-described function, as the inorganic acid salt in this modified example, for example, phosphate, borate, silicate, sulfate, molybdate, and tungstate may be used alone or in combination of two or more kinds. More specifically, as the inorganic acid salt, for example, zinc phosphate, calcium phosphate, sodium sulfate, potassium sulfate, potassium silicate, sodium borate, potassium borate, ammonium borate, potassium molybdate, sodium molybdate, potassium tungstate, sodium tungstate, or the like may be used. However, among these, it is more preferable that the inorganic acid salt be at least one compound selected from a group consisting of phosphate, borate, and silicate in consideration of convenience and the like during measurement of the thickness of each of the adhesion layer 110, the base layer 120, and the lubricant layer 130.

In addition, the heat resistant resin as a main chemical composition is contained in the base layer 120. During the cold working, since the surface treated steel sheet 1 becomes a relative high temperature due to a frictional force between the surface treated steel sheet 1 that is a base material and the mold, it is necessary for the surface treatment film 100 to maintain a shape as a film even under the high-temperature working conditions. From this viewpoint, it is preferable that the heat resistant resin in this modified example have heat resistance that is capable of maintaining the film shape at a temperature (for example, a predetermined temperature higher than 200° C. and equal to or lower than 400° C.) exceeding an arrival temperature (approximately, 200° C.) during the cold working. In addition, in this modified example, since the surface treatment film 100 is formed using the water-based surface treatment liquid, it is preferable that the heat resistant resin in this modified example be water-soluble in consideration of stability of the surface treatment liquid.

From the above-described function, as the heat resistant resin in this modified example, for example, a polyimide resin, a polyester resin, an epoxy resin, a fluorine resin, or the like may be used. To secure relatively higher heat resistance and water solubility, particularly, it is preferable to use at least one resin selected from a group consisting of the polyimide resin and the fluorine resin as the heat resistant resin. Furthermore, it is more preferable to use the polyimide resin as the heat resistant resin.

In addition, a composition of the base layer 120 also has an effect on a composition of the surface treated steel sheet 1. Therefore, in this modified example, the base layer 120 contains the heat resistant resin as a main chemical composition so as to give a working follow-up property and heat resistance to the surface treatment film 100. Furthermore, in the base layer 120, for example, a contained amount of an inorganic component such as phosphate, borate, silicate, molybdate, and tungstate is adjusted to be smaller than a contained amount of the heat resistant resin. Specifically, the base layer 120 contains 0.1 to 10 parts by mass of the inorganic acid salt to 100 parts by mass of the heat resistant resin. When the contained amount of the inorganic acid salt is less than 0.1 parts by mass, the coefficient of friction of the surface treatment film 100 increases, and thus sufficient lubricity may not be obtained. On the other hand, when the contained amount of the inorganic acid salt exceeds 100 parts by mass, the performance of the base layer 120 that supports the lubricant 131 is not sufficiently exhibited.

In addition, it is necessary for the base layer 120 to have a thickness of 0.1 µm to 15 µm. When the thickness of the base layer 120 is less than 0.1 µm, the performance of the base layer 120 that supports the lubricant 131 is not sufficiently exhibited. On the other hand, when the thickness of the base layer 120 exceeds 15 µm, since the thickness of the base layer 120 excessively increases, there is a tendency for indentation scratching to occur during the cold working. From the viewpoint of improving the performance of the base layer 120 that supports the lubricant 131, it is preferable that the thickness of the base layer 120 be 0.5 µm or more. In addition, from the viewpoint of reliably preventing the indentation scratching during the working, it is preferable that the thickness of the base layer 120 be 3 µm or less.

<Lubricant Layer 130>

The lubricant layer 130 has a function of reducing the coefficient of friction by improving lubricity of the surface treatment film 100. Specifically, the lubricant layer 130 is located on a side close to the outermost surface of the surface treatment film 100, and contains the largest amount of the lubricant 131 among the three layers configuring the surface treatment film 100.

In this modified example, the lubricant 131 is not particularly limited as long as the surface treatment film 100 having the gradient-type three-layer structure may be formed, and the lubricity of the surface treatment film 100 may be sufficiently improved. For example, as the lubricant 131, at least one compound selected from a group consisting of polytetrafluoroethylene, molybdenum disulfide, tungsten disulfide, zinc oxide, and graphite may be used.

In addition, it is necessary for the lubricant layer 130 to have a thickness of 0.1 µm to 10 µm. When the thickness of the lubricant layer 130 is less than 0.1 µm, sufficient lubricity may not be obtained. On the other hand, when the thickness of the lubricant layer 130 exceeds 10 µm, a surplus residue is generated during the working, and there is a problem in that this surplus residue is attached to a mold or the like. From the viewpoint of further improving the lubricity, it is preferable that the thickness of the lubricant layer 130 be 1 µm or more. In addition, from the viewpoint of further reliably preventing the generation of the surplus residue during the working, it is preferable that the thickness of the lubricant layer 130 is 6 µm or less.

Furthermore, a thickness ratio between the lubricant layer 130 and the base layer 120 is also important to carry out the function of the base layer 120 and the function of the lubricant layer 130. Specifically, the ratio of the thickness of the lubricant layer 130 to the thickness of the base layer 120, that is, it is necessary for (the thickness of the lubricant layer/the thickness of the base layer) to be 0.2 to 10. When the (the thickness of the lubricant layer/the thickness of the base layer) is less than 0.2, the surface treatment film 100 (the entirety of the film) becomes too hard, and thus the lubricity may not be sufficiently obtained. On the other hand, when the (the thickness of the lubricant layer/the thickness of the base layer) exceeds 10, a property of supporting the lubricant 131 becomes inferior, and thus a working follow-up property of the entirety of the film is deficient.

<Confirmation Method of Layer Formation, and Measurement Method and Determination Method of Film Thickness of Each Layer>

As described above, in the surface treated steel sheet 1 according to this modified example, it is important that three layers, which include the adhesion layer 110 close to the steel sheet 10, the lubricant layer 130 close to the film surface, and the base layer 120 positioned therebetween, are made to be present. When any one of these layers is omitted, it is difficult to exhibit the lubricity capable of enduring the cold working, which is intended in this modified example. In addition, in a case where the thickness of each layer of the adhesion layer 110, the base layer 120, and the lubricant layer 130 is not within the above-described range, it is also difficult to exhibit the lubricity capable of enduring the cold working, which is intended in this modified example. Accordingly, in this modified example, a method of confirming whether or not each of the adhesion layer 110, the base layer 120, and the lubricant layer 130 are formed, and a method of measuring the thickness of each of the layers is also important.

First, with regard to the method of confirming the formation of each layer of the adhesion layer 110, the base layer 120, and the lubricant layer 130, the formation of each of the layers may be confirmed by a quantitative analysis of elements in the film thickness direction (depth direction) of the surface treatment film 100 using the high-frequency GDS. That is, first, in the main chemical compositions that are contained in the surface treated film 100 (the chemical composition derived from the silanol bond, the inorganic acid salt, the heat resistant resin, and the lubricant), representative elements (characteristic elements in chemical compositions) are set in each layer. For example, with regard to the chemical composition derived from the silanol bond, Si is appropriately set as the representative element. In addition, for example, with regard to the lubricant, in a case where the lubricant is polytetrafluoroethylene, F is appropriately set as the representative element, and in a case where the lubricant is molybdenum disulfide, Mo is appropriately set as the representative element. Next, from a high-frequency GDS measurement chart, the intensity of a peak corresponding to each of the representative elements is obtained, and the concentration of each chemical composition is calculated from the peak intensity that is obtained for each position in the film thickness direction.

The method of determining the thickness of each layer in this modified example is defined as follows.

First, the thickness of the lubricant layer 130 is a distance from the outermost surface of the surface treatment film 100 to a position (depth) in the film thickness direction at which peak intensity is 1/2 times the maximum value of the peak intensity with regard to the representative element (for example, F, Mo, W, Zn, or C) of the lubricant that is set as described above in the high-frequency GDS measurement chart. That is, the interface between the lubricant layer 130 and the base layer 120 is consistent with a position in the film thickness direction at which the peak intensity of the representative element of the lubricant becomes 1/2 times the maximum value of the peak intensity thereof.

In addition, the thickness of the adhesion layer 110 is the distance from the interface between the surface treatment film 100 and the steel sheet 10 to a position (depth) in the film thickness direction at which the peak intensity is 1/2 times the maximum value of the peak intensity with regard to the representative element (Si) of the chemical composition derived from the silanol bond in the high-frequency GDS measurement chart. That is, the interface between the adhesion layer 110 and the base layer 120 is consistent with a position in the film thickness direction at which the peak intensity of the representative element (Si) of the chemical composition derived from the silanol bond becomes 1/2 times the maximum value of the peak intensity.

Furthermore, the thickness of the base layer 120 is a distance from the position at which peak intensity is 1/2 times the maximum value of the peak intensity with regard to the representative element of the lubricant to a position at which peak intensity is 1/2 times the maximum value of the peak intensity with regard to the representative element (Si) of the chemical composition derived from the silanol bond. In addition, for example, a cross-section of the surface treatment film 100 may be observed by a microscope to obtain a total thickness of the surface treatment film 100, and this total thickness of the surface treated film 100 may be subtracted by a total thickness of the adhesion layer 110 and the lubricant layer 130 to obtain the thickness of the base layer 120.

However, in a case of using graphite as the lubricant 131, when carbon (C) is set as the representative element that determines the interface between the lubricant layer 130 and the base layer 120, it is difficult to distinguish C in the lubricant 131 and C originating from the heat resistant resin or the like. Therefore, the thickness of the lubricant layer 130 is obtained using a representative element (for example, P, B, or Si) of the inorganic acid salt. In this case, the interface between the lubricant layer 130 and the base layer 120 is consistent with a position in the film thickness direction at which the peak intensity of the representative element of the inorganic acid salt becomes 1/2 times the maximum value of the peak intensity thereof.

In addition, in a case of using silicate as the inorganic acid salt of the base layer 120, when silicon (Si) is set as the representative element that determines the interface between the base layer 120 and the adhesion layer 110, it is difficult to distinguish Si originating from silicate (inorganic acid salt) and Si originating from the chemical composition derived from the silanol bond of the adhesion layer 110. Therefore, the thickness of each of the adhesion layer 110 and the base layer 120 are obtained using carbon (C) originating from the heat resistant resin component of the base layer 120 as the representative element. Furthermore, in a case of using molybdate or tungstate as the inorganic acid salt of the base layer 120, when molybdenum (Mo) or tungsten (W) is set as the representative element that determines the interface between the lubricant layer 130 and the base layer 120, it is difficult to distinguish Mo or W originating from the inorganic acid salt and Mo or W originating from the lubricant 131. Therefore, the thickness of each of the base layer 120 and the lubricant layer 130 are obtained using sulfur (S) originating from the lubricant 131 as the representative element.

In addition, with regard to a calculation method of the thickness of each layer, a position at which the peak intensity is 1/2 times the maximum value of the peak intensity in the representative element of each chemical composition, that is, a position in the film thickness direction of the surface treatment film 100 may be obtained from a sputtering time by the high-frequency GDS (in a case of this modified example, a time in terms of a sputtering rate of $SiO_2$) by the high-frequency GDS.

Furthermore, in this modified example, the base layer 120 contains 0.01 to 10 parts by mass of the inorganic acid salt to 100 parts by mass of the heat resistant resin. A method of measuring the mass of the heat resistant resin and the inorganic acid salt in the base layer 120 is as follows. A film is ground in a thickness direction by a microtome to cut out the base layer. This film is collected in an amount with which analysis may be performed, and then this collected film is crushed with an agate mortar. After the crushing, an initial weight of the collected film is measured, and water is added thereto to dissolve the inorganic acid salt (inorganic compound). After dissolving the inorganic acid salt, the film is sufficiently dried. The weight of the film after being dried is determined as parts by mass of the heat resistant resin, and the difference between the initial weight and the weight of the film after being dried is regarded as parts by mass of the inorganic acid salt.

[Method of Manufacturing Surface Treated Steel Sheet]

Hereinbefore, the configuration of the surface treated steel sheet has been described in detail. Subsequently, a method of manufacturing the surface treated steel sheet having this configuration will be described.

In the method of manufacturing the surface treated steel sheet, a water-based surface treatment liquid, which contains a water-soluble silane coupling agent, a water-soluble inorganic acid salt, a water-soluble heat resistant resin, and the lubricant, is applied to at least one surface of the steel sheet 10 (the steel sheet of the above-described embodiment), and then this surface treatment liquid is dried, whereby the surface treatment film 100 is formed on at least one surface of the steel sheet 10.

(With Regard to Surface Treatment Liquid)

The surface treatment liquid that is used in the method of manufacturing the surface treated steel sheet includes the water-soluble silane coupling agent, the water-soluble inorganic acid salt, the water-soluble heat resistant resin, and the lubricant, since the details of the inorganic acid salt, the heat resistant resin, and the lubricant were described above, a description thereof will be omitted here.

The water-soluble silane coupling agent is not particularly limited, and may be a silane coupling agent in the related art. For example, 3-aminopropyl trimethoxy silane, N-2-(aminomethyl)-3-aminopropyl methyl dimethoxy silane, 3-glycidoxypropyl trimethoxy silane, 3-glycidoxypropyl triethoxy silane, or the like may be used.

In addition, various additives may be added to the surface treatment liquid.

As the surface treatment liquid that is used in the method of manufacturing the surface treated steel sheet, a leveling agent that improves coating properties, a water-soluble solvent, a metal stabilizing agent, an etching inhibitor, a regulating agent, and the like may be used within a range not deteriorating the effect of the modified example. As the leveling agent, a nonionic or cationic surfactant may be used. Examples of the leveling agent include polyethylene oxide, a polypropylene oxide additive, and acetylene glycol compound, and the like. Examples of the water-soluble solvent include alcohols such as ethanol, isopropyl alcohol, t-butyl alcohol, and propylene glycol; cellosolves such as ethylene glycol monobutyl ether and ethylene glycol monoethyl ether; esters such as ethyl acetate and butyl acetate; ketones such as acetone, methyl ethyl ketone, and methyl isobutyl ketone; and the like. Examples of the metal stabilizing agent include a chelate compound such as EDTA and DTPA. Examples of the etching inhibitor include amine compounds such as ethylene diamine, triethylene pentamine, guanidine, and pyrimidine. However, particularly, since an amine compound having two or more amino groups in one molecule also has an effect as the metal stabilizing agent, it is more preferable to use the amine compound as the etching inhibitor. Example of pH adjusting agent include organic acids such as acetic acid and latic acid; inorganic acids such as hydrofluoric acid; an ammonium salt; amines; and the like.

By dissolving or dispersing each of the above-described chemical composition uniformly in water, it is possible to prepare the surface treatment liquid that is used in the method of manufacturing the surface treated steel sheet.

(Application and Drying of Surface Treatment Liquid)

As a method of applying the surface treatment liquid onto the steel sheet 10, for example, a method of immersing the steel sheet 10 in the surface treatment liquid, or the like may be used. In this case, it is necessary to warm the steel sheet 10 in advance to a temperature that is higher than the temperature of the surface treatment liquid or to dry the steel sheet 10 with warm air during drying thereof. Specifically, for example, the steel sheet 10 is immersed in warm water of approximately 80° C. for approximately 1 minute, and then is immersed in the surface treatment liquid of 40 to 60° C. for approximately 1 second, and then is dried at room temperature for approximately 2 minutes. According to this method, the gradient-type surface treatment film 100 having three-layer structure of the adhesion layer 110, the base layer 120, and the lubricant layer 130 may be formed.

(Method of Controlling Film Thickness of Each Layer)

The film thickness of each of the layers configuring the surface treatment film 100 may be adjusted to be within the above-described film thickness range by appropriately controlling the application amount of the surface treatment liquid, the concentration of each chemical composition in the surface treatment liquid, the reactivity between the surface treatment liquid and the steel sheet 10 that is a base material, and the hydrophilicity and hydrophobicity of the surface treatment liquid.

(Reason why Gradient-Type Film is Formed)

As described above, with regard to the reason why the gradient-type surface treatment film 100 is formed when the surface treatment liquid obtained by dissolving or dispersing the water-soluble silane coupling agent, the water-soluble inorganic acid salt, the water-soluble heat resistant resin, and the lubricant in water is applied onto the steel sheet 10, and is dried. The present inventor assumed the reason of the above as follows. First, as described above, the steel sheet 10 is warmed in advance to a temperature higher than that of the surface treatment liquid, since the temperature of the steel sheet 10 is higher than that of the surface treatment liquid, in the thin film that is formed after the surface treatment liquid is applied on the steel sheet 10, a temperature of a solid-liquid interface is high, and a temperature of the gas-liquid interface is low. Therefore, a temperature difference occurs in the thin film, water that is a solvent is vaporized, and convection slightly occurs in the thin film. In the case of drying the thin film, which is formed by applying the room-temperature surface treatment liquid onto the room-temperature steel sheet 10, is dried with warm air, the temperature of the gas-liquid interface is increased, the surface tension at the gas-liquid interface decreases, and thus a variation in temperature and a variation in surface tension are mitigated. As a result, convection slightly occurs in the thin film. In any application and drying method described above, the surface treatment liquid is separated into a component having high affinity with air (for example, the lubricant) and a component having high affinity with a metal or water (for example, the inorganic acid salt or the heat resistant resin) simultaneously with occurrence of the convection. Then, water is gradually vaporized, and the surface treatment liquid has a film shape, and the gradient-type film having a concentration gradient for each chemical composition is formed.

In addition, in this modified example, the silane coupling agent has high affinity with the metal on the surface of the steel sheet 10, and thus the silane coupling agent diffuses to the vicinity of the steel sheet 10 in the thin film. Then, it is considered that the silane coupling agent that reaches the vicinity of the steel sheet 10 forms a covalent bond with a metal oxide (for example, zinc oxide in a case where the steel sheet 10 is plate with zinc) that is present on the surface of the steel sheet 10, and the silanol bond expressed by Si—O—X is formed. As described above, when the silanol bond is formed in the vicinity of the steel sheet 10, adhesiveness between the surface treated film 100 and the steel sheet 10 is significantly improved, and thus occurrence of seizure and galling is prevented.

[Comparison with Other Surface Treatment Methods and Summary of Modified Example]

In addition, in the cold working, a temperature of contact portions of the steel sheet and the mold is relatively raised (to approximately 300° C. higher) due to friction between the steel sheet and the mold. Therefore, when a steel sheet to which any surface treatment is not applied is subject to the cold working, in a case where lubricity between the steel sheet and the mold is not sufficient, there is a tendency for the seizure or galling to occur between the steel sheet and the mold. In this case, the mold is locally broken, or abrasion occurs rapidly, and thus an operational lifespan of the mold may be significantly shortened.

To prevent the seizure or galling, commonly, a surface treatment (hereinafter, may be referred to as a "lubricant treatment"), which gives lubricity to the surface of the steel sheet that is to be subjected to the cold working, is performed to the steel sheet. As this lubricant treatment, a phosphate treatment (bonderizing treatment), which is performed to form a phosphate film formed from a phosphate compound (zinc phosphate, manganese phosphate, calcium phosphate, iron phosphate, or the like) on the surface of the steel sheet, has been known in the related art.

The phosphate-treated steel sheet has a relatively higher seizure prevention performance and galling prevention performance. However, transition from a working field, such as hot forging and a cutting process accompanied with large shape deformation, to cold working is in progress in the background of recent environmental measures, and thus there is demand to perform more sever plastic working on the steel sheet for cold working. From this viewpoint, a composite film, which is obtained by laminating a layer formed from a metal soap (for example, sodium stearate) on the phosphate film, has been widely used. This composite film has an excellent seizure prevention function and a galling prevention function even under hard friction conditions due to high-surface-pressure pressing during the cold working.

When the composite film is formed by this lubricant treatment, the metal soap reacts with the phosphate film, and thus high lubricity is exhibited. However, since this lubricant treatment needs various complicated treatment processes such as a washing process and a reaction process that allows the metal soap and the phosphate film to react with each other (process management such as treatment liquid management or a temperature management during reaction is also necessary), and the lubricant treatment is a batch process, there is a problem in that productivity decreases. In addition, in the lubricant treatment using the composite film, there is also a problem of disposal of waste liquid that is generated during the treatment, and thus this treatment is not preferable also from the viewpoint of environment conservation.

On the other hand, in this modified example, the surface treated steel sheet can be manufactured with a convenient treatment process and with a manufacturing method that is also very suitable from the global environment conservation, and has excellent lubricity. Therefore, the working method may transfer from a working field accompanied with large shape deformation such as hot forging in which energy consumption is large and cutting in which a large amount of material loss occurs to cold working on the background of recent environmental countermeasures. Furthermore, when the above-described surface treated steel sheet is used, even when relatively more hard plastic working or further complicate working is required, the material (steel sheet) may be worked without any problem while not generating the seizure or galling with the mold. Particularly, when the surface treated film, which may be appropriately used for the hard cold working, is formed on the surface of the steel sheet of the above-described embodiment that may be appropriately used for the hard cold working, a synergistic effect (integral workability) between the workability of the steel sheet that is a base material and the steel sheet follow-up property of the surface treated film may be obtained. Accordingly, even when the cold working is performed with respect to the steel sheet, sufficient workability may be secured without decreasing an operational lifespan of the mold. Furthermore, when the medium carbon steel sheet for cold working of this modified example is applied to the cold working and the high-frequency quenching, a component having excellent mechanical properties due to the synergistic effect may be manufactured with a high yield ratio, and resource saving and saving of energy may be accomplished.

Hereinbefore, the very suitable embodiment of the present invention has been described in detail while referring to the drawings, but the present invention is not limited to the example. It should be understood by a person having ordinary skill in the art that various modified examples and variation examples may be made without departing from the technical idea described in the attached claims, and these naturally belong to the technical scope of the present invention.

EXAMPLES

Next, examples of the present invention will be described, but conditions of the examples are one conditional example adapted to confirm an execution possibility and an effect of the present invention, and the present invention is not limited to the one conditional example. The present invention may adapt various conditions as long as the object of the present invention is accomplished without departing from the gist of the present invention.

Steel having the above-described chemical composition shown in Table 1 was dissolved, was hot-rolled, and was annealed to manufacture each steel sheet having a hardness, a diameter of carbide, and a spheroidizing ratio of the carbide that are different in each steel sheet, and the cold workability and the high-frequency quenching hardness were observed. Hereinafter, a method of manufacturing the steel sheet will be described.

A steel ingot (cast slab) having a sheet thickness of 150 mm was held at 1,220° C. for 2 hours, and then was hot-rolled under a condition in which a rolling termination temperature is 870° C. to obtain a hot-rolled steel sheet having a sheet thickness of 6 mm. Then, this hot-rolled steel sheet was cooled to a first cooling temperature at a first average cooling rate shown in Tables 2 to 7, and was cooled to a second cooling temperature at a second average cooling rate shown in Tables 2 to 7, and then the resultant steel sheet was cooled with air after being wound. In addition, it was confirmed that an interval from 550 to 400° C. was held for 30 hours or less.

Samples (corresponding to steel Nos. A, B, C, K, and L) having a sheet thickness of 2 mm were obtained from each hot-rolled steel sheet by cutting a surface layer of 2.0 mm and a rear surface layer of 2.0 mm in a sheet thickness direction. In addition, a surface layer of 0.5 mm and a rear surface layer of 0.5 mm were cut from each hot-rolled steel sheet manufactured under the same conditions to obtain samples (corresponding to steel Nos. D, E, M, N, O, P, and Q) having a sheet thickness of 5 mm.

Similarly, a steel ingot that was casted under a vacuum atmosphere and has a sheet thickness of 150 mm was held at 1,240° C. for 1.5 hours, and then was hot-rolled under a condition in which the rolling termination temperature is 920° C. to obtain a hot-rolled steel sheet having a sheet thickness of 16 mm. Then, this steel sheet was cooled to the first cooling temperature at the first average cooling rate shown in Tables 2 to 7, and then was cooled to the second cooling temperature at the second average cooling rate shown in Tables 2 to 7, and then was cooled with air after being wound. In addition, it was confirmed that an interval from 550 to 400° C. was held for 30 hours or less.

A surface layer of 3.5 mm and a rear surface layer of 3.5 mm were cut from each hot-rolled steel sheet described above to obtain samples (corresponding to sheet Nos. F, G, R, U, and V) having a sheet thickness of 9 mm. In addition, a surface layer of 2.0 mm was cut from the hot-rolled steel sheet manufactured under the same conditions to obtain samples (corresponding to steel Nos. H, W, X, and Y) having a sheet thickness of 12 mm. Furthermore, hot-rolled steel sheets having a sheet thickness of 16 mm, which were not subjected to the cutting, were used as samples (corresponding to steel Nos. I, J, Z, AA, and AB).

An $A_{C1}$ temperature of each sample was measured by a thermal expansion test. Here, in this thermal expansion test, a temperature at which austenite transformation initiates during the heating at an average heating rate of 30° C./hour close to that of a box annealing furnace of a real machine was determined as the $A_{C1}$ temperature.

Each of the samples (corresponding to steel Nos. A to AB) was annealed in a hydrogen 95% atmosphere under six conditions such as at 680° C. for 3 hours (corresponding to Table 2), at 680° C. for 30 hours (corresponding to Table 3), at 700° C. for 30 hours (corresponding to Table 4), at 740° C. for 10 hours (corresponding to Table 5), at 700° C. for 90 hours (corresponding to Table 6), and at 700° C. for 60 hours (corresponding to Table 7). The samples, which were annealed at 680° C. and 700° C., were subjected to furnace cooling after retention (annealing) was terminated. The sample, which was annealed at 740° C., was cooled to 700° C. at an average cooling rate of 2° C./second after the retention was completed, and then was subjected to the furnace cooling. In addition, for example, the samples (steel sheet Nos. A-1 to AB-1), which were annealed at 680° C. for 3 hours, are shown in Table 2, and the sample of steel sheet Nos. A-1 to AB-1 were prepared from samples having chemical compositions of steel Nos. A to AB, respectively.

In a high-frequency quenching test, each of the samples (steel sheet Nos. A-1 to B-6) was heated at a frequency of 78 kHz from room temperature to 1,000±20° C. at an average heating rate set to 100±15° C./second in a temperature range of 750° C. or higher, was held at 1,000±20° C. for 10±0.5 seconds, was quickly cooled to room temperature at an average cooling rate set to 200±10° C./second between 800° C. and 400° C., and Vickers hardness (quenching hardness) of the quenched material was measured. In addition, a flat-sheet bending test specimen having a width of 30 mm and a length of 100 mm was prepared from each sample, and a bending test was carried out under conditions at which the bending radius was set to 1/2 times the sheet thickness, and the bending angle was set to 90°. Then, the number of cracks at regions of 1/8 to 3/8 and 5/8 to 7/8 of the sheet thickness in a sheet thickness cross-section of a bending angle portion (maximum curvature portion) of the flat-sheet bending sample was measured by a scanning electron microscope at a magnification of 3,000 times. In a case where the number of cracks was within 20 per 1 mm$^2$, it was determined that the occurrence of cracks caused by interfacial peeling during the cooling working was suppressed, and thus the cooling workability was evaluated as "good". In addition, in a case where the number of cracks exceeded 20, the cold workability was evaluated as "poor". In addition, these cracks were classified for each kind (a crack starting from cementite, a crack starting from sulfide, and an transgranular crack) and then were counted. An energy dispersion X-ray spectroscope (EDS) attached to a scanning electron microscope was used to distinguish the cracks starting from cementite and the cracks starting from sulfide. In addition, the average diameter of the carbide and the spheroidizing ratio of the carbide were measured using the above-described method.

TABLE 1

| Steel No. | Components (mass %) | | | | | | | | | | | |
|---|---|---|---|---|---|---|---|---|---|---|---|---|
| | C | Si | Mn | P | S | Al | N | Cr | Ni | Cu | Mo | Nb |
| A | 0.44 | 0.19 | 0.73 | 0.023 | 0.0061 | 0.014 | 0.004 | 0.007 | | | | |
| B | 0.42 | 0.23 | 0.54 | 0.013 | 0.0032 | 0.076 | 0.005 | 0.002 | 0.26 | 0.16 | 0.26 | |
| C | 0.45 | 0.27 | 1.28 | 0.016 | 0.0042 | 0.094 | 0.005 | 0.031 | 0.22 | | 0.48 | |
| D | 0.49 | 0.22 | 1.01 | 0.014 | 0.0072 | 0.054 | 0.005 | 0.004 | | | | |
| E | 0.47 | 0.25 | 1.50 | 0.013 | 0.0029 | 0.054 | 0.007 | 0.064 | | 0.32 | 0.42 | |
| F | 0.41 | 0.30 | 0.58 | 0.018 | 0.0018 | 0.076 | 0.010 | 0.014 | 0.36 | | | 0.31 |
| G | 0.35 | 0.14 | 1.90 | 0.030 | 0.0054 | 0.009 | 0.009 | 0.064 | | 0.33 | 0.14 | 0.40 |
| H | 0.58 | 0.10 | 1.81 | 0.012 | 0.0070 | 0.079 | 0.007 | 0.077 | 0.10 | | | 0.32 |
| I | 0.55 | 0.25 | 0.71 | 0.018 | 0.0005 | 0.082 | 0.008 | 0.086 | | 0.21 | 0.01 | |
| J | 0.32 | 0.24 | 0.39 | 0.021 | 0.0058 | 0.082 | 0.008 | 0.035 | | 0.34 | 0.48 | 0.44 |
| K | 0.42 | 0.16 | 0.50 | 0.007 | 0.0080 | 0.057 | 0.004 | 0.088 | | | 0.69 | 0.09 |
| L | 0.49 | 0.26 | 0.18 | 0.026 | 0.0020 | 0.014 | 0.005 | 0.017 | | | | |
| M | 0.41 | 0.04 | 1.45 | 0.009 | 0.0016 | 0.006 | 0.004 | 0.051 | | | | |
| N | 0.22 | 0.21 | 0.81 | 0.027 | 0.0042 | 0.015 | 0.008 | 0.017 | | | | |
| O | 0.55 | 0.19 | 2.62 | 0.017 | 0.0073 | 0.017 | 0.004 | 0.009 | | | | |
| P | 0.56 | 0.28 | 2.37 | 0.011 | 0.0088 | 0.051 | 0.008 | 0.067 | | 0.47 | | 0.42 |
| Q | 0.55 | 0.03 | 0.64 | 0.028 | 0.0033 | 0.013 | 0.006 | 0.017 | | 0.26 | 0.22 | |
| R | 0.41 | 0.11 | 1.47 | 0.019 | 0.0095 | 0.043 | 0.011 | 0.131 | | | | |
| U | 0.63 | 0.23 | 1.66 | 0.012 | 0.0043 | 0.131 | 0.003 | 0.022 | 0.42 | | 0.36 | |
| V | 0.48 | 0.23 | 0.96 | 0.021 | 0.0120 | 0.009 | 0.010 | 0.065 | 0.82 | | | |
| W | 0.64 | 0.19 | 0.87 | 0.014 | 0.0012 | 0.083 | 0.003 | 0.086 | | | | |
| X | 0.37 | 0.24 | 0.62 | 0.014 | 0.0076 | 0.022 | 0.005 | 0.036 | | | | |
| Y | 0.20 | 0.16 | 1.03 | 0.006 | 0.0048 | 0.009 | 0.002 | 0.089 | | | 0.42 | 0.59 |
| Z | 0.42 | 0.44 | 1.67 | 0.038 | 0.0007 | 0.071 | 0.001 | 0.095 | | | | |
| AA | 0.41 | 0.23 | 2.15 | 0.027 | 0.0029 | 0.020 | 0.002 | 0.128 | 0.06 | | | |
| AB | 0.34 | 0.23 | 0.71 | 0.009 | 0.0014 | 0.054 | 0.009 | 0.003 | | 0.37 | | 0.14 |

| Steel No. | Components (mass %) | | | | | | | | Remarks |
|---|---|---|---|---|---|---|---|---|---|
| | Ti | V | Ta | B | W | Sn | Sb | As | |
| A | | | | | | | | | Example |
| B | 0.022 | | | | | | | | Example |
| C | 0.006 | | | | 0.47 | 0.022 | 0.005 | | Example |
| D | | | | | | | | | Example |
| E | 0.019 | | 0.12 | 0.008 | | 0.020 | | 0.013 | Example |
| F | 0.044 | 0.30 | | 0.004 | | 0.02 | 0.026 | | Example |
| G | | | | 0.009 | | | | 0.029 | Example |
| H | | | 0.37 | 0.007 | 0.36 | 0.006 | 0.005 | 0.021 | Example |
| I | | 0.33 | | | 0.01 | | 0.023 | 0.005 | Example |
| J | | 0.03 | | 0.003 | 0.05 | | | 0.015 | Example |
| K | 0.048 | 0.01 | | 0.008 | 0.38 | | | | Comparative Example |
| L | | | | | | | | | Comparative Example |
| M | | | | | | | | | Comparative Example |
| N | | | | | | | | | Comparative Example |
| O | | | | | | | | | Comparative Example |
| P | 0.043 | | | 0.006 | 0.08 | | 0.017 | | Comparative Example |
| Q | | 0.28 | | 0.008 | | | | 0.022 | Comparative Example |
| R | | | | | | | | | Comparative Example |
| U | | | 0.43 | 0.009 | | 0.020 | | 0.006 | Comparative Example |
| V | 0.044 | 0.30 | | | 0.25 | 0.017 | | | Comparative Example |
| W | | | | | | | | | Comparative Example |

TABLE 1-continued

| | | | | | | | |
|---|---|---|---|---|---|---|---|
| X | | | | | | | Comparative Example |
| Y | | | 0.003 | 0.30 | | 0.022 | Comparative Example |
| Z | | | | | | | Comparative Example |
| AA | 0.078 | 0.17 | | 0.42 | | 0.014 | 0.017 Comparative Example |
| AB | 0.003 | 0.87 | | 0.08 | 0.011 | 0.017 | Comparative Example |

\* Underlines in the Table indicate that conditions of the invention are not satisfied.
\* Blanks in the Table represent non-addition of elements.

TABLE 2

| Steel sheet No. | First average cooling rate (° C./s) | First cooling termination temperature (° C.) | Second average cooling rate (° C./s) | Second cooling termination temperature (° C.) | Time for which steel sheet after winding is held at 400° C. or higher (hr) | Sheet thickness (mm) | $A_{C1}$ (° C.) | Annealing hardness (HV) | Average diameter of carbide (μm) | Right side of Expression (2) (μm) |
|---|---|---|---|---|---|---|---|---|---|---|
| A-1 | 20.8 | 555 | 18.3 | 463 | 14.2 | 2 | 720 | 168.4 | 0.16 | −0.22 |
| B-1 | 29.1 | 616 | 11.8 | 342 | 11.8 | 2 | 728 | 166.6 | 0.14 | 1.11 |
| C-1 | 25.4 | 605 | 26.0 | 439 | 17.2 | 2 | 729 | 175.2 | 0.11 | −0.30 |
| D-1 | 28.3 | 531 | 21.7 | 414 | 14.9 | 5 | 718 | 179.2 | 0.12 | −0.24 |
| E-1 | 25.9 | 523 | 7.7 | 451 | 12.0 | 5 | 713 | 177.1 | 0.12 | −0.29 |
| F-1 | 31.5 | 646 | 5.1 | 446 | 13.6 | 9 | 741 | 164.5 | 0.13 | −0.27 |
| G-1 | 35.2 | 679 | 7.7 | 441 | 13.4 | 9 | 749 | 154.2 | 0.10 | −0.36 |
| H-1 | 29.6 | 675 | 24.8 | 416 | 15.1 | 12 | 742 | 196.6 | 0.12 | −0.36 |
| I-1 | 34.7 | 548 | 26.3 | 443 | 16.6 | 16 | 732 | 189.6 | 0.14 | −0.23 |
| J-1 | 37.0 | 689 | 18.2 | 620 | 13.7 | 16 | 743 | 147.0 | 0.15 | −0.20 |
| K-1 | 36.1 | 662 | 23.3 | 460 | 13.4 | 2 | 735 | 166.6 | 0.12 | −0.23 |
| L-1 | 27.2 | 543 | 9.3 | 421 | 11.8 | 2 | 743 | 177.8 | 0.17 | −0.24 |
| M-1 | 25.5 | 674 | 27.8 | 468 | 17.9 | 5 | 708 | 166.7 | 0.12 | −0.26 |
| N-1 | 40.6 | 603 | 23.6 | 489 | 18.8 | 5 | 720 | 129.5 | 0.14 | −0.26 |
| O-1 | 30.8 | 694 | 15.2 | 556 | 13.3 | 5 | 697 | 194.9 | 0.10 | −0.34 |
| P-1 | 43.6 | 523 | 27.6 | 410 | 16.9 | 5 | 747 | 199.3 | 0.08 | −0.38 |
| Q-1 | 38.1 | 657 | 16.2 | 461 | 19.5 | 5 | 725 | 189.0 | 0.15 | −0.18 |
| R-1 | 39.8 | 567 | 28.1 | 448 | 14.9 | 9 | 710 | 164.2 | 0.14 | −0.25 |
| U-1 | 45.0 | 679 | 10.8 | 410 | 16.8 | 9 | 727 | 205.9 | 0.14 | −0.29 |
| V-1 | 37.8 | 622 | 10.1 | 546 | 13.9 | 9 | 749 | 176.8 | 0.14 | −0.21 |
| W-1 | 29.3 | 696 | 26.4 | 490 | 18.4 | 12 | 720 | 207.8 | 0.12 | −0.17 |
| X-1 | 28.7 | 550 | 22.1 | 454 | 14.0 | 12 | 728 | 156.3 | 0.14 | −0.16 |
| Y-1 | 41.2 | 649 | 29.0 | 513 | 13.6 | 12 | 748 | 126.3 | 0.13 | −0.26 |
| Z-1 | 47.8 | 635 | 21.4 | 450 | 10.3 | 16 | 714 | 167.6 | 0.13 | −0.26 |
| AA-1 | 42.0 | 612 | 5.1 | 538 | 13.4 | 16 | 728 | 166.4 | 0.09 | −0.35 |
| AB-1 | 39.5 | 510 | 8.6 | 437 | 17.7 | 16 | 749 | 152.1 | 0.13 | −0.22 |

| Steel sheet No. | Spheroidizing rate (%) | Quenching hardness (HV) | Crack starting from Cementite (number/mm²) | Cracks starting from sulfide (number/mm²) | Total number of cracks (number/mm²) | Cold workability | Remarks |
|---|---|---|---|---|---|---|---|
| A-1 | 59.6 | 685.0 | 22.5 | 7.3 | 29.8 | Poor | Comparative Example |
| B-1 | 92.7 | 477.4 | 3 | 1 | 4 | Good | Comparative Example |
| C-1 | 57.5 | 707.0 | 26.5 | 1 | 27.5 | Poor | Comparative Example |
| D-1 | 58.9 | 721.8 | 24.1 | 15.2 | 39.3 | Poor | Comparative Example |
| E-1 | 57.8 | 714.6 | 26.1 | 1 | 27.1 | Poor | Comparative Example |
| F-1 | 58.3 | 678.2 | 28.1 | 1 | 26.3 | Poor | Comparative Example |
| G-1 | 55.9 | 653.6 | 27.7 | 3.2 | 30.9 | Poor | Comparative Example |
| H-1 | 56.1 | 771.6 | 27.6 | 13.8 | 41.4 | Poor | Comparative Example |
| I-1 | 59.3 | 745.3 | 23.2 | 1 | 24.2 | Poor | Comparative Example |
| J-1 | 60.1 | 608.9 | 21.2 | 5.4 | 26.6 | Poor | Comparative Example |
| K-1 | 59.2 | 484.3 | 24.9 | 19.5 | 43 | Poor | Comparative Example |

TABLE 2-continued

| | | | | | | | |
|---|---|---|---|---|---|---|---|
| L-1 | 59.0 | 482.5 | 23.9 | 1 | 24.9 | Poor | Comparative Example |
| M-1 | 58.4 | 679.7 | 41.8 | 1 | 42.8 | Poor | Comparative Example |
| N-1 | 58.5 | 483.2 | 24.9 | 1 | 25.9 | Poor | Comparative Example |
| O-1 | 56.5 | 490.9 | 27.4 | 15.8 | 43.2 | Poor | Comparative Example |
| P-1 | 55.5 | 473.2 | 27.8 | 22.3 | 50.1 | Poor | Comparative Example |
| Q-1 | 60.4 | 739.9 | 38.3 | 1 | 39.3 | Poor | Comparative Example |
| R-1 | 58.8 | 475.5 | 28.5 | 23.8 | 48.1 | Poor | Comparative Example |
| U-1 | 57.8 | 784.3 | 43.8 | 1 | 44.8 | Poor | Comparative Example |
| V-1 | 59.7 | 711.1 | 22.2 | 25.6 | 47.8 | Poor | Comparative Example |
| W-1 | 60.7 | 782.3 | 37.1 | 1 | 38.1 | Poor | Comparative Example |
| X-1 | 61.0 | 668.3 | 18.8 | 17.5 | 36.3 | Poor | Comparative Example |
| Y-1 | 58.5 | 493.7 | 24.9 | 1.5 | 26.4 | Poor | Comparative Example |
| Z-1 | 58.6 | 683.7 | 20.1 | 1 | 42.3 | Poor | Comparative In-grain crack 21.2/mm$^2$ |
| AA-1 | 56.3 | 491.7 | 27.5 | 1 | 28.5 | Poor | Comparative Example |
| AB-1 | 59.6 | 488.4 | 22.5 | 1 | 23.5 | Poor | Comparative Example |

* Underlines in the Table represent that conditions of the invention or effects in the examples are not satisfied.

TABLE 3

| Steel sheet No. | First average cooling rate (° C./s) | First cooling termination temperature (° C.) | Second average cooling rate (° C./s) | Second cooling termination temperature (° C.) | Time for which steel sheet after winding is held at 400° C. or higher (hr) | Sheet thickness (mm) | $A_{C1}$ (° C.) | Annealing hardness (HV) | Average diameter of carbide (μm) | Right side of Expression (2) (μm) |
|---|---|---|---|---|---|---|---|---|---|---|
| A-2 | 45.1 | 633 | 12.7 | 434 | 17.1 | 2 | 720 | 166.0 | 0.19 | 0.42 |
| B-2 | 48.7 | 519 | 16.1 | 427 | 15.2 | 2 | 728 | 163.1 | 0.20 | 0.42 |
| C-2 | 40.3 | 552 | 19.1 | 467 | 16.2 | 2 | 729 | 167.9 | 0.17 | 0.32 |
| D-2 | 45.5 | 549 | 10.7 | 433 | 14.4 | 5 | 718 | 177.1 | 0.17 | 0.42 |
| E-2 | 24.0 | 582 | 12.5 | 573 | 12.4 | 5 | 713 | 174.2 | 0.15 | −0.42 |
| F-2 | 35.3 | 651 | 22.5 | 526 | 18.9 | 9 | 741 | 162.8 | 0.18 | 0.43 |
| G-2 | 33.1 | 484 | 25.2 | 421 | 14.7 | 9 | 749 | 156.0 | 0.67 | 0.31 |
| H-2 | 38.6 | 724 | 13.0 | 509 | 14.9 | 12 | 742 | 193.3 | 0.27 | 0.23 |
| I-2 | 43.7 | 691 | 14.3 | 690 | 18.9 | 16 | 732 | 186.6 | 0.16 | −0.32 |
| J-2 | 23.0 | 514 | 12.3 | 405 | 16.2 | 16 | 743 | 147.5 | 0.21 | 0.42 |
| K-2 | 34.5 | 694 | 24.1 | 563 | 11.4 | 2 | 735 | 164.2 | 0.18 | 0.33 |
| L-2 | 41.1 | 618 | 28.7 | 446 | 12.8 | 2 | 743 | 175.1 | 0.17 | 0.36 |
| M-2 | 25.2 | 579 | 18.5 | 461 | 15.5 | 5 | 708 | 163.2 | 0.17 | 0.35 |
| N-2 | 48.0 | 579 | 25.9 | 444 | 11.8 | 5 | 720 | 131.3 | 0.20 | 0.41 |
| O-2 | 36.8 | 675 | 11.2 | 446 | 17.4 | 5 | 697 | 193.0 | 0.11 | 0.27 |
| P-2 | 42.6 | 658 | 16.2 | 465 | 12.8 | 5 | 747 | 186.2 | 0.11 | 0.26 |
| Q-2 | 36.5 | 621 | 10.4 | 495 | 10.6 | 5 | 725 | 185.1 | 0.18 | 0.43 |
| R-2 | 31.5 | 548 | 28.8 | 419 | 10.9 | 9 | 710 | 164.3 | 0.16 | 0.30 |
| U-2 | 24.8 | 530 | 12.3 | 477 | 16.3 | 9 | 727 | 201.4 | 0.17 | 0.33 |
| V-2 | 38.4 | 546 | 16.2 | 420 | 14.9 | 9 | 749 | 174.6 | 0.18 | 0.40 |
| W-2 | 25.6 | 588 | 27.0 | 448 | 15.5 | 12 | 720 | 200.4 | 0.17 | 0.42 |
| X-2 | 41.9 | 614 | 19.3 | 544 | 20.0 | 12 | 728 | 154.6 | 0.22 | 0.39 |
| Y-2 | 40.7 | 594 | 15.1 | 518 | 20.0 | 12 | 748 | 127.9 | 0.16 | 0.34 |
| Z-2 | 30.6 | 649 | 5.1 | 432 | 18.9 | 16 | 714 | 165.8 | 0.13 | 0.35 |
| AA-2 | 32.8 | 653 | 12.5 | 422 | 13.0 | 16 | 728 | 162.9 | 0.12 | 0.29 |
| AB-2 | 44.8 | 541 | 24.7 | 410 | 15.0 | 16 | 749 | 152.3 | 0.17 | 0.40 |

| Steel sheet No. | Spheroidizing rate (%) | Quenching hardness (HV) | Crack starting from Cementite (number/mm$^2$) | Cracks starting from sulfide (number/mm$^2$) | Total number of cracks (number/mm$^2$) | Cold workability | Remarks |
|---|---|---|---|---|---|---|---|
| A-2 | 75.5 | 631.7 | 3.3 | 7.3 | 10.6 | Good | Example |
| B-2 | 75.6 | 618.2 | 3.3 | 1 | 4.3 | Good | Example |
| C-2 | 72.9 | 648.6 | 3.6 | 1 | 4.6 | Good | Example |

TABLE 3-continued

| | | | | | | | | |
|---|---|---|---|---|---|---|---|---|
| | D-2 | 75.5 | 661.8 | 3.3 | 15.2 | 18.5 | Good | Example |
| | E-2 | 54.4 | 659.0 | 27.9 | 1 | 28.9 | Poor | Comparative Example |
| | F-2 | 75.8 | 615.0 | 6 | 1 | 4.2 | Good | Example |
| | G-2 | 72.7 | 487.6 | 24.1 | 3.2 | 27.3 | Poor | Comparative Example |
| | H-2 | 70.8 | 718.6 | 21.4 | 13.8 | 35.2 | Poor | Comparative Example |
| | I-2 | 57.1 | 696.8 | 27 | 1 | 28 | Poor | Comparative Example |
| | J-2 | 75.4 | 551.4 | 3.3 | 5.4 | 8.7 | Good | Example |
| | K-2 | 73.2 | 429.3 | 5 | 19.5 | 23.1 | Poor | Comparative Example |
| | L-2 | 73.9 | 437.2 | 3.5 | 1 | 4.5 | Good | Comparative Example |
| | M-2 | 73.7 | 625.2 | 24.1 | 1 | 25.1 | Poor | Comparative Example |
| | N-2 | 75.2 | 461.6 | 3.3 | 1 | 4.3 | Good | Comparative Example |
| | O-2 | 71.7 | 443.6 | 3.9 | 15.8 | 19.7 | Good | Comparative Example |
| | P-2 | 71.5 | 455.3 | 4 | 22.3 | 26.3 | Poor | Comparative Example |
| | Q-2 | 75.7 | 688.9 | 28.2 | 1 | 29.2 | Poor | Comparative Example |
| | R-2 | 72.4 | 430.9 | 8 | 23.8 | 27.6 | Poor | Comparative Example |
| | U-2 | 73.2 | 731.1 | 30.7 | 1 | 31.7 | Poor | Comparative Example |
| | V-2 | 74.9 | 657.5 | 3.3 | 25.6 | 28.9 | Poor | Comparative Example |
| | W-2 | 75.4 | 727.5 | 22.9 | 1 | 23.9 | Poor | Comparative Example |
| | X-2 | 74.8 | 589.2 | 3.3 | 17.5 | 20.8 | Poor | Comparative Example |
| | Y-2 | 73.5 | 450.8 | 3.5 | 1.5 | 5 | Good | Comparative Example |
| | Z-2 | 73.7 | 638.3 | 1.8 | 1 | 23 | Poor | Comparative Example In-grain crack 20.2/mm² |
| | AA-2 | 72.2 | 460.8 | 3.8 | 1 | 4.8 | Good | Comparative Example |
| | AB-2 | 75.1 | 474.7 | 3.3 | 1 | 4.3 | Good | Comparative Example |

\* Underlines in the Table represent that conditions of the invention or effects in the examples are not satisfied.

TABLE 4

| Steel sheet No. | First average cooling rate (° C./s) | First cooling termination temperature (° C.) | Second average cooling rate (° C./s) | Second cooling termination temperature (° C.) | Time for which steel sheet after winding is held at 400° C. or higher (hr) | Sheet thickness (mm) | $A_{C1}$ (° C.) | Annealing hardness (HV) | Average diameter of carbide (μm) | Right side of Expression (2) (μm) |
|---|---|---|---|---|---|---|---|---|---|---|
| A-3 | 22.1 | 521 | 20.6 | 411 | 11.1 | 2 | 720 | 157.5 | 0.32 | 0.96 |
| B-3 | 35.9 | 637 | 38.7 | 502 | 15.0 | 2 | 728 | 156.5 | 0.31 | 1.05 |
| C-3 | 26.4 | 543 | 15.2 | 441 | 14.6 | 2 | 729 | 163.9 | 0.25 | 0.92 |
| D-3 | 62.3 | 570 | 7.5 | 501 | 19.2 | 5 | 718 | 165.5 | 0.30 | 1.02 |
| E-3 | 49.3 | 699 | 5.3 | 578 | 11.2 | 5 | 713 | 170.5 | 0.43 | 0.47 |
| F-3 | 73.4 | 679 | 24.6 | 403 | 17.8 | 9 | 741 | 153.5 | 0.33 | 1.09 |
| G-3 | 24.3 | 514 | 14.8 | 414 | 16.8 | 9 | 749 | 151.2 | 0.19 | 0.90 |
| H-3 | 48.3 | 608 | 17.5 | 503 | 15.3 | 12 | 742 | 188.9 | 0.18 | 0.92 |
| I-3 | 21.3 | 530 | 8.6 | 425 | 13.1 | 16 | 732 | 175.8 | 0.27 | 0.96 |
| J-3 | 46.3 | 574 | 24.3 | 460 | 18.0 | 16 | 743 | 142.1 | 0.30 | 0.98 |
| K-3 | 49.4 | 545 | 25.1 | 426 | 14.7 | 2 | 735 | 159.3 | 0.27 | 0.92 |
| L-3 | 20.2 | 669 | 16.6 | 615 | 13.1 | 2 | 743 | 162.3 | 0.33 | 0.98 |
| M-3 | 49.0 | 698 | 18.1 | 488 | 15.6 | 5 | 708 | 158.8 | 0.24 | 0.83 |
| N-3 | 49.4 | 681 | 14.4 | 468 | 15.1 | 5 | 720 | 131.5 | 0.32 | 0.97 |
| O-3 | 28.0 | 563 | 23.7 | 502 | 14.9 | 5 | 697 | 192.8 | 0.13 | 0.82 |
| P-3 | 45.2 | 687 | 29.2 | 606 | 14.5 | 5 | 747 | 172.5 | 0.22 | 0.81 |
| Q-3 | 21.7 | 677 | 15.6 | 612 | 17.9 | 5 | 725 | 175.2 | 0.29 | 0.92 |
| R-3 | 31.2 | 606 | 24.0 | 537 | 12.6 | 9 | 710 | 160.3 | 0.21 | 0.97 |
| U-3 | 44.5 | 694 | 18.8 | 429 | 13.1 | 9 | 727 | 192.1 | 0.23 | 0.97 |
| V-3 | 47.4 | 700 | 13.1 | 440 | 15.0 | 9 | 749 | 164.7 | 0.28 | 0.94 |
| W-3 | 48.3 | 693 | 12.8 | 413 | 12.8 | 12 | 720 | 187.6 | 0.29 | 1.00 |
| X-3 | 35.9 | 564 | 8.3 | 483 | 19.8 | 12 | 728 | 146.9 | 0.34 | 0.97 |

TABLE 4-continued

| Steel sheet No. | | | | | | | | | |
|---|---|---|---|---|---|---|---|---|---|
| Y-3 | 27.8 | 696 | 14.5 | 421 | 9.0 | 12 | 748 | 128.8 | 0.23 | 0.96 |
| Z-3 | 45.4 | 684 | 8.5 | 623 | 14.7 | 16 | 714 | 162.5 | 0.22 | 0.82 |
| AA-3 | 43.3 | 687 | 8.2 | 547 | 17.1 | 16 | 728 | 158.1 | 0.24 | 0.88 |
| AB-3 | 35.1 | 696 | 16.3 | 621 | 17.4 | 16 | 749 | 144.6 | 0.30 | 0.89 |

| Steel sheet No. | Spheroidizing rate (%) | Quenching hardness (HV) | Crack starting from Cementite (number/mm$^2$) | Cracks starting from sulfide (number/mm$^2$) | Total number of cracks (number/mm$^2$) | Cold workability | Remarks |
|---|---|---|---|---|---|---|---|
| A-3 | 88.9 | 577.2 | 3 | 7.3 | 10.3 | Good | Example |
| B-3 | 91.2 | 469.7 | 3 | 1 | 4 | Good | Comparative Example |
| C-3 | 88.1 | 604.4 | 3 | 1 | 4 | Good | Example |
| D-3 | 90.5 | 489.7 | 3 | 15.2 | 18.2 | Good | Comparative Example |
| E-3 | 76.8 | 624.5 | 3.2 | 1 | 4.2 | Good | Example |
| F-3 | 92.2 | 470.2 | 5.8 | 1 | 4 | Good | Comparative Example |
| G-3 | 87.4 | 558.8 | 3 | 3.2 | 6.2 | Good | Example |
| H-3 | 87.9 | 676.6 | 3 | 13.8 | 16.8 | Good | Example |
| I-3 | 89.1 | 646.0 | 3 | 1 | 4 | Good | Example |
| J-3 | 89.4 | 505.8 | 3 | 5.4 | 8.4 | Good | Example |
| K-3 | 87.9 | 419.4 | 4.4 | 19.5 | 22.5 | Poor | Comparative Example |
| L-3 | 89.5 | 426.1 | 3 | 1 | 4 | Good | Comparative Example |
| M-3 | 85.8 | 584.4 | 23.9 | 1 | 24.9 | Poor | Comparative Example |
| N-3 | 89.3 | 407.6 | 3 | 1 | 4 | Good | Comparative Example |
| O-3 | 85.5 | 410.3 | 3 | 15.8 | 18.8 | Good | Comparative Example |
| P-3 | 85.2 | 426.7 | 3 | 22.3 | 25.3 | Poor | Comparative Example |
| Q-3 | 87.9 | 639.6 | 28.2 | 1 | 29.2 | Poor | Comparative Example |
| R-3 | 89.3 | 386.6 | 7.2 | 23.8 | 26.8 | Poor | Comparative Example |
| U-3 | 89.3 | 687.8 | 30.7 | 1 | 31.7 | Poor | Comparative Example |
| V-3 | 88.4 | 614.9 | 3 | 25.6 | 28.6 | Poor | Comparative Example |
| W-3 | 90.1 | 478.8 | 22.8 | 1 | 23.8 | Poor | Comparative Example |
| X-3 | 89.2 | 552.8 | 3 | 17.5 | 20.5 | Poor | Comparative Example |
| Y-3 | 88.9 | 405.6 | 3 | 1.5 | 4.5 | Good | Comparative Example |
| Z-3 | 85.4 | 595.9 | 1.1 | 1 | 22.4 | Poor | Comparative Example In-grain crack 20.3/mm$^2$ |
| AA-3 | 86.9 | 451.2 | 3 | 1 | 4 | Good | Comparative Example |
| AB-3 | 87.3 | 432.5 | 3 | 1 | 4 | Good | Comparative Example |

* Underlines in the Table represent that conditions of the invention or effects in the examples are not satisfied.

TABLE 5

| Steel sheet No. | First average cooling rate (° C./s) | First cooling termination temperature (° C.) | Second average cooling rate (° C./s) | Second cooling termination temperature (° C.) | Time for which steel sheet after winding is held at 400° C. or higher (hr) | Sheet thickness (mm) | $A_{C1}$ (° C.) | Annealing hardness (HV) | Average diameter of carbide (μm) | Right side of Expression (2) (μm) |
|---|---|---|---|---|---|---|---|---|---|---|
| A-4 | 36.0 | 615 | 15.3 | 494 | 17.4 | 2 | 720 | 136.1 | 0.61 | 1.36 |
| B-4 | 31.6 | 648 | 7.5 | 554 | 13.7 | 2 | 728 | 137.2 | 0.62 | 1.38 |
| C-4 | 37.6 | 694 | 6.6 | 622 | 18.5 | 2 | 729 | 146.3 | 0.49 | 1.26 |
| D-4 | 24.8 | 671 | 15.0 | 451 | 11.2 | 5 | 718 | 139.9 | 0.59 | 1.32 |
| E-4 | 24.1 | 662 | 9.2 | 525 | 9.6 | 5 | 713 | 155.1 | 0.47 | 1.27 |
| F-4 | 45.6 | 689 | 17.0 | 454 | 13.2 | 9 | 741 | 136.1 | 0.63 | 1.32 |
| G-4 | 47.2 | 630 | 10.9 | 557 | 17.7 | 9 | 749 | 147.4 | 0.32 | 1.29 |
| H-4 | 29.3 | 726 | 20.9 | 540 | 15.2 | 12 | 742 | 171.7 | 0.34 | 1.26 |
| I-4 | 35.3 | 642 | 18.2 | 410 | 10.8 | 16 | 732 | 145.6 | 0.56 | 1.35 |

TABLE 5-continued

| | | | | | | | | | | |
|---|---|---|---|---|---|---|---|---|---|---|
| J-4 | 40.3 | 599 | 6.7 | 502 | 11.3 | 16 | 743 | 134.2 | <u>0.64</u> | 1.38 |
| K-4 | 28.3 | 612 | 5.4 | 469 | 18.8 | 2 | 735 | 143.3 | 0.52 | 1.39 |
| L-4 | 36.4 | 678 | 17.5 | 434 | 15.3 | 2 | 743 | 136.3 | <u>0.64</u> | 1.38 |
| M-4 | 32.5 | 653 | 17.2 | 527 | 14.4 | 5 | 708 | 144.8 | 0.48 | 1.28 |
| N-4 | 26.5 | 676 | 29.2 | 423 | 15.6 | 5 | 720 | 131.0 | 0.58 | 1.29 |
| O-4 | 37.3 | 620 | 18.7 | 473 | 16.0 | 5 | 697 | 187.4 | 0.17 | 1.15 |
| P-4 | 42.1 | 628 | 13.8 | 502 | 14.3 | 5 | 747 | 161.3 | 0.43 | 1.17 |
| Q-4 | 28.5 | 632 | 21.0 | 499 | 15.7 | 5 | 725 | 143.6 | 0.57 | 1.30 |
| R-4 | 44.4 | 698 | 8.4 | 509 | 17.4 | 9 | 710 | 149.4 | 0.42 | 1.30 |
| U-4 | 37.9 | 676 | 20.3 | 574 | 14.9 | 9 | 727 | 164.7 | 0.44 | 1.23 |
| V-4 | 24.2 | 694 | 7.5 | 461 | 16.9 | 9 | 749 | 145.6 | 0.53 | 1.34 |
| W-4 | 30.0 | 526 | 22.9 | 410 | 15.7 | 12 | 720 | 149.5 | 0.56 | 1.37 |
| X-4 | 49.1 | 545 | 23.5 | 407 | 13.2 | 12 | 728 | 131.6 | <u>0.66</u> | 1.39 |
| Y-4 | 35.8 | 524 | 13.6 | 471 | 16.8 | 12 | 748 | 129.6 | 0.44 | 1.31 |
| Z-4 | 26.3 | 547 | 28.4 | 438 | 13.1 | 16 | 714 | 149.2 | 0.41 | 1.23 |
| AA-4 | 42.1 | 501 | 18.6 | 411 | 13.9 | 16 | 728 | 147.2 | 0.47 | 1.25 |
| AB-4 | 28.5 | 585 | 24.5 | 487 | 10.1 | 16 | 749 | 134.8 | 0.60 | 1.30 |

| Steel sheet No. | Spheroidizing rate (%) | Quenching hardness (HV) | Crack starting from Cementite (number/mm²) | Cracks starting from sulfide (number/mm²) | Total number of cracks (number/mm²) | Cold workability | Remarks |
|---|---|---|---|---|---|---|---|
| <u>A-4</u> | <u>98.9</u> | <u>477.5</u> | 3 | 7.3 | 10.3 | Good | Comparative Example |
| <u>B-4</u> | <u>99.4</u> | <u>462.4</u> | 3 | 1 | 4 | Good | Comparative Example |
| <u>C-4</u> | <u>96.5</u> | <u>454.2</u> | 3 | 1 | 4 | Good | Comparative Example |
| <u>D-4</u> | <u>98.1</u> | <u>450.3</u> | 3 | 15.2 | 18.2 | Good | Comparative Example |
| <u>E-4</u> | <u>96.8</u> | <u>479.8</u> | 3 | 1 | 4 | Good | Comparative Example |
| <u>F-4</u> | <u>98.0</u> | <u>465.2</u> | 5.8 | 1 | 4 | Good | Comparative Example |
| <u>G-4</u> | <u>97.3</u> | <u>484.5</u> | 3 | 3.2 | 6.2 | Good | Comparative Example |
| <u>H-4</u> | <u>96.6</u> | <u>493.0</u> | 3 | 13.8 | 16.8 | Good | Comparative Example |
| <u>I-4</u> | <u>98.8</u> | <u>483.4</u> | 3 | 1 | 4 | Good | Comparative Example |
| <u>J-4</u> | <u>99.6</u> | <u>397.5</u> | 3 | 5.4 | 8.4 | Good | Comparative Example |
| <u>K-4</u> | <u>99.8</u> | <u>381.0</u> | 4.4 | 19.5 | <u>22.5</u> | Poor | Comparative Example |
| <u>L-4</u> | <u>99.6</u> | <u>389.7</u> | 3 | 1 | 4 | Good | Comparative Example |
| <u>M-4</u> | <u>96.9</u> | <u>492.3</u> | <u>24.2</u> | 1 | <u>25.2</u> | Poor | Comparative Example |
| <u>N-4</u> | <u>97.3</u> | <u>318.0</u> | 3 | 1 | 4 | Good | Comparative Example |
| <u>O-4</u> | <u>93.7</u> | <u>365.3</u> | 3 | 15.8 | 18.8 | Good | Comparative Example |
| <u>P-4</u> | <u>94.2</u> | <u>419.7</u> | 3 | <u>22.3</u> | <u>25.3</u> | Poor | Comparative Example |
| <u>Q-4</u> | <u>97.5</u> | <u>484.1</u> | <u>28.3</u> | 1 | <u>29.3</u> | Poor | Comparative Example |
| <u>R-4</u> | <u>97.4</u> | <u>303.6</u> | 7.2 | <u>23.8</u> | <u>26.8</u> | Poor | Comparative Example |
| <u>U-4</u> | <u>95.7</u> | <u>479.6</u> | <u>30.7</u> | 1 | <u>31.7</u> | Poor | Comparative Example |
| <u>V-4</u> | <u>98.4</u> | <u>456.3</u> | 3 | <u>25.6</u> | <u>28.6</u> | Poor | Comparative Example |
| <u>W-4</u> | <u>99.2</u> | <u>449.4</u> | <u>24.2</u> | 1 | <u>25.2</u> | Poor | Comparative Example |
| <u>X-4</u> | <u>99.7</u> | <u>423.5</u> | 3 | 17.5 | <u>20.5</u> | Poor | Comparative Example |
| <u>Y-4</u> | <u>97.7</u> | <u>323.1</u> | 3 | 1.5 | 4.5 | Good | Comparative Example |
| <u>Z-4</u> | <u>95.7</u> | <u>455.9</u> | 1.2 | 1 | <u>22.8</u> | Poor | Comparative Example In-grain crack 20.6/mm² |
| <u>AA-4</u> | <u>96.3</u> | <u>444.7</u> | 3 | 1 | 4 | Good | Comparative Example |
| <u>AB-4</u> | <u>97.5</u> | <u>421.6</u> | 3 | 1 | 4 | Good | Comparative Example |

* Underlines in the Table represent that conditions of the invention or effects in the examples are not satisfied.

TABLE 6

| Steel sheet No. | First average cooling rate (° C./s) | First cooling termination temperature (° C.) | Second average cooling rate (° C./s) | Second cooling termination temperature (° C.) | Time for which steel sheet after winding is held at 400° C. or higher (hr) | Sheet thickness (mm) | $A_{C1}$ (° C.) | Annealing hardness (HV) | Average diameter of carbide (μm) | Right side of Expression (2) (μm) |
|---|---|---|---|---|---|---|---|---|---|---|
| A-5 | 18.5 | 660 | 15.5 | 479 | 19.5 | 2 | 720 | 139.6 | 0.65 | 0.98 |
| B-5 | 45.7 | 640 | 19.8 | 430 | 16.9 | 2 | 728 | 140.6 | 0.56 | 0.97 |
| C-5 | 29.9 | 532 | 27.6 | 444 | 16.1 | 2 | 729 | 149.7 | 0.53 | 0.94 |
| D-5 | 31.2 | 641 | 3.6 | 459 | 8.1 | 5 | 718 | 142.8 | 0.62 | 0.86 |
| E-5 | 29.9 | 578 | 18.4 | 483 | 15.6 | 5 | 713 | 158.5 | 0.46 | 0.84 |
| F-5 | 46.9 | 506 | 9.4 | 434 | 17.2 | 9 | 741 | 139.5 | 0.52 | 0.92 |
| G-5 | 29.9 | 735 | 21.9 | 692 | 15.3 | 9 | 749 | 149.6 | 0.44 | 0.40 |
| H-5 | 21.0 | 562 | 13.8 | 403 | 15.5 | 12 | 742 | 174.5 | 0.37 | 0.94 |
| I-5 | 22.6 | 599 | 21.7 | 470 | 13.3 | 16 | 732 | 149.3 | 0.58 | 0.99 |
| J-5 | 41.8 | 524 | 2.1 | 413 | 18.0 | 16 | 743 | 137.6 | 0.67 | 0.59 |
| K-5 | 48.0 | 653 | 5.4 | 493 | 15.7 | 2 | 735 | 146.0 | 0.54 | 0.94 |
| L-5 | 22.6 | 630 | 27.7 | 576 | 14.7 | 2 | 743 | 141.3 | 0.67 | 1.01 |
| M-5 | 40.4 | 578 | 14.6 | 446 | 14.0 | 5 | 708 | 147.1 | 0.52 | 0.84 |
| N-5 | 49.6 | 590 | 23.2 | 471 | 15.3 | 5 | 720 | 133.3 | 0.61 | 0.99 |
| O-5 | 36.1 | 534 | 8.5 | 457 | 19.4 | 5 | 697 | 192.0 | 0.21 | 0.84 |
| P-5 | 28.1 | 694 | 18.8 | 642 | 18.3 | 5 | 747 | 163.8 | 0.47 | 0.83 |
| Q-5 | 35.8 | 518 | 21.8 | 407 | 17.4 | 5 | 725 | 145.9 | 0.62 | 0.94 |
| R-5 | 30.5 | 541 | 13.9 | 445 | 13.2 | 9 | 710 | 153.8 | 0.46 | 1.00 |
| U-5 | 24.6 | 685 | 21.8 | 446 | 10.8 | 9 | 727 | 167.1 | 0.46 | 0.99 |
| V-5 | 48.4 | 557 | 7.5 | 446 | 14.8 | 9 | 749 | 148.4 | 0.56 | 0.95 |
| W-5 | 32.9 | 679 | 17.2 | 598 | 14.4 | 12 | 720 | 153.7 | 0.59 | 1.11 |
| X-5 | 40.7 | 589 | 29.6 | 503 | 16.3 | 12 | 728 | 133.7 | 0.59 | 0.99 |
| Y-5 | 40.1 | 697 | 19.0 | 517 | 15.7 | 12 | 748 | 132.9 | 0.47 | 0.98 |
| Z-5 | 48.3 | 550 | 17.3 | 494 | 16.7 | 16 | 714 | 152.7 | 0.44 | 0.84 |
| AA-5 | 39.8 | 535 | 6.5 | 436 | 14.5 | 16 | 728 | 150.3 | 0.51 | 0.89 |
| AB-5 | 45.0 | 520 | 13.7 | 422 | 14.2 | 16 | 749 | 139.5 | 0.64 | 0.91 |

| Steel sheet No. | Spheroidizing rate (%) | Quenching hardness (HV) | Crack starting from Cementite (number/mm²) | Cracks starting from sulfide (number/mm²) | Total number of cracks (number/mm²) | Cold workability | Remarks |
|---|---|---|---|---|---|---|---|
| A-5 | 89.6 | 463.3 | 3 | 7.3 | 10.3 | Good | Comparative Example |
| B-5 | 89.2 | 535.6 | 3 | 1 | 4 | Good | Example |
| C-5 | 88.5 | 565.6 | 3 | 1 | 4 | Good | Example |
| D-5 | 86.4 | 436.8 | 3 | 15.2 | 18.2 | Good | Comparative Example |
| E-5 | 86.0 | 587.9 | 3 | 1 | 4 | Good | Example |
| F-5 | 87.9 | 582.4 | 5.8 | 1 | 4 | Good | Example |
| G-5 | 74.9 | 515.5 | 22.6 | 3.2 | 25.8 | Poor | Comparative Example |
| H-5 | 88.5 | 642.5 | 3 | 13.8 | 16.8 | Good | Example |
| I-5 | 89.8 | 590.7 | 3 | 1 | 4 | Good | Example |
| J-5 | 79.8 | 454.8 | 22.6 | 5.4 | 28 | Poor | Comparative Example |
| K-5 | 88.6 | 375.1 | 4.4 | 19.5 | 22.5 | Poor | Comparative Example |
| L-5 | 90.2 | 392.2 | 3 | 1 | 4 | Good | Comparative Example |
| M-5 | 86.1 | 552.0 | 23.9 | 1 | 24.9 | Poor | Comparative Example |
| N-5 | 89.8 | 364.4 | 3 | 1 | 4 | Good | Comparative Example |
| O-5 | 86.1 | 356.9 | 3 | 15.8 | 18.8 | Good | Comparative Example |
| P-5 | 85.8 | 396.6 | 3 | 22.3 | 25.3 | Poor | Comparative Example |
| Q-5 | 88.6 | 603.8 | 28.2 | 1 | 29.2 | Poor | Comparative Example |
| R-5 | 90.1 | 351.2 | 7.2 | 23.8 | 26.8 | Poor | Comparative Example |
| U-5 | 89.7 | 632.7 | 30.7 | 1 | 31.7 | Poor | Comparative Example |
| V-5 | 88.8 | 583.9 | 3 | 25.6 | 28.6 | Poor | Comparative Example |
| W-5 | 92.7 | 433.6 | 22.8 | 1 | 23.8 | Poor | Comparative Example |
| X-5 | 89.8 | 527.9 | 3 | 17.5 | 20.5 | Poor | Comparative Example |
| Y-5 | 89.4 | 366.0 | 3 | 1.5 | 4.5 | Good | Comparative Example |

TABLE 6-continued

| | | | | | | | |
|---|---|---|---|---|---|---|---|
| Z-5 | 86.0 | 561.0 | 1.1 | 1 | 22.4 | Poor | Comparative Example In-grain crack 20.3/mm$^2$ |
| AA-5 | 87.3 | 417.1 | 3 | 1 | 4 | Good | Comparative Example |
| AB-5 | 87.8 | 391.7 | 3 | 1 | 4 | Good | Comparative Example |

\* Underlines in the Table represent that conditions of the invention or effects in the examples are not satisfied.

TABLE 7

| Steel sheet No. | First average cooling rate (° C./s) | First cooling termination temperature (° C.) | Second average cooling rate (° C./s) | Second cooling termination temperature (° C.) | Time for which steel sheet after winding is held at 400° C. or higher (hr) | Sheet thickness (mm) | $A_{C1}$ (° C.) | Annealing hardness (HV) | Average diameter of carbide (μm) | Right side of Expression (2) (μm) |
|---|---|---|---|---|---|---|---|---|---|---|
| A-6 | 49.7 | 719 | 10.8 | 596 | 19.8 | 2 | 720 | 145.8 | 0.49 | 0.15 |
| B-6 | 16.5 | 505 | 15.8 | 434 | 16.0 | 2 | 728 | 145.6 | 0.63 | 0.99 |
| C-6 | 35.3 | 696 | 6.2 | 658 | 16.0 | 2 | 729 | 153.9 | 0.55 | 0.52 |
| D-6 | 39.2 | 463 | 10.5 | 405 | 16.5 | 5 | 718 | 151.2 | 0.75 | 0.96 |
| E-6 | 49.5 | 507 | 9.7 | 455 | 14.2 | 5 | 713 | 161.8 | 0.45 | 0.76 |
| F-6 | 35.4 | 691 | 32.1 | 591 | 14.2 | 9 | 741 | 144.0 | 0.48 | 1.02 |
| G-6 | 34.4 | 533 | 15.8 | 426 | 15.7 | 9 | 749 | 147.4 | 0.27 | 0.84 |
| H-6 | 49.0 | 576 | 23.0 | 475 | 16.6 | 12 | 742 | 178.6 | 0.28 | 0.86 |
| I-6 | 38.5 | 526 | 26.2 | 471 | 20.2 | 16 | 732 | 160.4 | 0.30 | 0.33 |
| J-6 | 23.0 | 653 | 20.5 | 362 | 15.6 | 16 | 743 | 137.1 | 0.49 | 1.32 |
| K-6 | 31.6 | 649 | 15.1 | 464 | 16.1 | 2 | 735 | 150.1 | 0.40 | 0.86 |
| L-6 | 42.7 | 534 | 18.3 | 465 | 10.6 | 2 | 743 | 149.0 | 0.50 | 0.92 |
| M-6 | 48.9 | 549 | 24.5 | 438 | 10.7 | 5 | 708 | 150.3 | 0.38 | 0.77 |
| N-6 | 45.3 | 522 | 12.8 | 427 | 14.0 | 5 | 720 | 129.8 | 0.46 | 0.91 |
| O-6 | 41.4 | 642 | 26.9 | 485 | 14.8 | 5 | 697 | 188.6 | 0.17 | 0.76 |
| P-6 | 23.8 | 609 | 21.9 | 409 | 15.7 | 5 | 747 | 165.0 | 0.34 | 0.75 |
| Q-6 | 43.0 | 515 | 13.7 | 422 | 16.3 | 5 | 725 | 157.5 | 0.46 | 0.86 |
| R-6 | 27.7 | 525 | 10.8 | 414 | 15.4 | 9 | 710 | 154.3 | 0.34 | 0.92 |
| U-6 | 39.6 | 506 | 18.1 | 428 | 12.8 | 9 | 727 | 177.0 | 0.34 | 0.91 |
| V-6 | 21.5 | 624 | 20.7 | 510 | 16.0 | 9 | 749 | 153.9 | 0.42 | 0.87 |
| W-6 | 33.8 | 627 | 26.7 | 544 | 19.0 | 12 | 720 | 169.0 | 0.45 | 0.99 |
| X-6 | 44.4 | 543 | 21.4 | 408 | 12.6 | 12 | 728 | 137.9 | 0.52 | 0.99 |
| Y-6 | 22.5 | 678 | 10.0 | 621 | 14.3 | 12 | 748 | 128.2 | 0.35 | 0.90 |
| Z-6 | 34.0 | 680 | 17.7 | 579 | 13.0 | 16 | 714 | 154.7 | 0.33 | 0.76 |
| AA-6 | 23.8 | 532 | 10.4 | 478 | 11.7 | 16 | 728 | 151.5 | 0.38 | 0.82 |
| AB-6 | 38.8 | 698 | 25.3 | 547 | 16.6 | 16 | 749 | 139.4 | 0.47 | 0.83 |

| Steel sheet No. | Spheroidizing rate (%) | Quenching hardness (HV) | Crack starting from Cementite (number/mm$^2$) | Cracks starting from sulfide (number/mm$^2$) | Total number of cracks (number/mm$^2$) | Cold workability | Remarks |
|---|---|---|---|---|---|---|---|
| A-6 | 68.7 | 510.1 | 5.3 | 7.3 | 12.6 | Poor | Comparative Example |
| B-6 | 89.8 | 445.3 | 3 | 1 | 4 | Good | Comparative Example |
| C-6 | 78.1 | 573.6 | 23.2 | 1 | 24.2 | Poor | Comparative Example |
| D-6 | 88.9 | 456.9 | 3 | 15.2 | 18.2 | Good | Comparative Example |
| E-6 | 84.1 | 596.2 | 3 | 1 | 4 | Good | Example |
| F-6 | 90.6 | 442.1 | 5.8 | 1 | 4 | Good | Comparative Example |
| G-6 | 86.0 | 528.1 | 3 | 3.2 | 6.2 | Good | Example |
| H-6 | 86.5 | 647.4 | 3 | 13.8 | 16.8 | Good | Example |
| I-6 | 73.2 | 606.9 | 3.6 | 1 | 4.6 | Good | Example |
| J-6 | 98.0 | 471.3 | 3 | 5.4 | 8.4 | Good | Comparative Example |
| K-6 | 86.5 | 390.7 | 4.4 | 19.5 | 22.5 | Poor | Comparative Example |
| L-6 | 88.1 | 401.8 | 3 | 1 | 4 | Good | Comparative Example |
| M-6 | 84.2 | 556.9 | 23.9 | 1 | 24.9 | Poor | Comparative Example |
| N-6 | 87.8 | 380.2 | 3 | 1 | 4 | Good | Comparative Example |
| O-6 | 84.1 | 377.1 | 3 | 15.8 | 18.8 | Good | Comparative Example |

TABLE 7-continued

| | | | | | | | |
|---|---|---|---|---|---|---|---|
| P-6 | 83.8 | 405.2 | 3 | 22.3 | 25.3 | Poor | Comparative Example |
| Q-6 | 86.5 | 609.6 | 28.2 | 1 | 29.2 | Poor | Comparative Example |
| R-6 | 87.9 | 362.3 | 7.2 | 23.8 | 26.8 | Poor | Comparative Example |
| U-6 | 87.7 | 650.0 | 30.7 | 1 | 31.7 | Poor | Comparative Example |
| V-6 | 86.8 | 589.1 | 3 | 25.6 | 28.6 | Poor | Comparative Example |
| W-6 | 89.7 | 449.0 | 22.8 | 1 | 23.8 | Poor | Comparative Example |
| X-6 | 89.7 | 535.1 | 3 | 17.5 | 20.5 | Poor | Comparative Example |
| Y-6 | 87.4 | 380.1 | 3 | 1.5 | 4.5 | Good | Comparative Example |
| Z-6 | 84.0 | 566.9 | 1.2 | 1.1 | 22.4 | Poor | Comparative Example In-grain crack 20.1/mm$^2$ |
| AA-6 | 85.4 | 426.2 | 3 | 1 | 4 | Good | Comparative Example |
| AB-6 | 85.8 | 405.9 | 3 | 1 | 4 | Good | Comparative Example |

* Underlines in the Table represent that conditions of the invention or effects in the examples are not satisfied.

In steel sheet Nos. A-2 to D-2, F-2, J-2, A-3, C-3, E-3, G-3 to J-3, B-5, C-5, E-5, F-5, H-5, I-5, E-6, and G-6 to I-6 in Tables 3, 4, 6 and 7, the average diameter of the carbide and the spheroidizing ratio of the carbide were appropriately controlled, and thus the cold workability and the high-frequency quenching hardenability (quenching hardness) were excellent.

On the other hand, in steel sheet Nos. A-1 to AB-1 in Table 2, the annealing time was short, and the spheroidizing ratio of the carbide was less than 70%, and thus the cold workability was not sufficient. In addition, in steel sheets Nos. A-4 to AB-4 in Table 5, the spheroidizing ratio of the carbide exceeded 90%, and thus the high-frequency quenching hardenability was not sufficient. In steel sheet Nos. D-3 and F-3 in Table 4, since the first average cooling rate exceeded 50° C./second, carbide having a spheroidizing ratio of 90% or more was generated from bainite in the hot-rolled steel sheet, and thus the high-frequency quenching hardenability was not sufficient. Furthermore, in steel sheet Nos. A-5 and B-6 in Tables 6 and 7, since the first average cooling rate was less than 20° C./second, the average diameter of the carbide exceeded 0.6 μm, and thus the high-frequency quenching hardenability was not sufficient. In steel sheet Nos. H-4 and A-6 in Tables 5 and 7, since the first cooling termination temperature exceeded 700° C., defects due to scale occurred. In steel sheet Nos. H-2 and G-5 in Tables 3 and 6, since the first cooling termination temperature exceeded 700° C., the average diameter of the carbide and the spheroidizing ratio of the carbide did not satisfy Expression (2) described above, and thus the cold workability was not sufficient. In steel sheet Nos. G-2 and D-6 in Tables 3 and 7, since the first cooling termination temperature was less than 500° C., the average diameter of the carbide exceeded 0.6 μm, and thus the high-frequency quenching hardenability was not sufficient. In this case, it was considered that austenite to which working strain applied after hot rolling was rich, and thus coarse pearlite was preferentially generated from the austenite during cooling. In steel sheet Nos. B-3 and F-6 in Tables 4 and 7, since the second average cooling rate exceeded 30° C., carbide having the spheroidizing ratio of 90% or more was generated, and thus the high-frequency quenching hardenability was not sufficient. In steel sheet Nos. D-5 and J-5 in Table 6, since the second average cooling rate was less than 5° C./second, the average diameter of the carbide exceeded 0.6 μm, and thus the high-frequency quenching hardenability was not sufficient. In steel sheet Nos. E-2 and 1-2 in Table 3, since the second cooling termination temperature was higher than a temperature lower than the first cooling termination temperature by 50° C., the spheroidizing ratio of the carbide was less than 70%, and thus the cold workability was not sufficient. In steel sheet No. C-6 in Table 7, since the second cooling termination temperature was higher than a temperature lower than the first cooling termination temperature by 50° C., the average diameter of the carbide and the spheroidizing ratio did not satisfy Expression (2) described above, and thus the cold workability was not sufficient. In steel sheet No. J-6 in Table 7, since the second cooling termination temperature was less than 400° C., carbide having spheroidizing ratio of 90% or more was generated, and thus the high-frequency quenching hardenability was not sufficient.

In steel sheet Nos. K-2, K-3, K-5, and K-6 in Tables 3, 4, 6, and 7, since the Mo content exceeded 0.5 mass %, the carbide was not sufficiently dissolved during the high-frequency heating, and the high-frequency quenching hardenability was not sufficient. In steel sheet Nos. L-2, L-3, L-5, and L-6, since the Mn content was less than 0.3 mass %, the hardenability of the steel decreased, and thus the high-frequency quenching hardenability was not sufficient. In steel sheet Nos. M-2, Q-2, M-3, Q-3, M-5, Q-5, M-6, and Q-6, since the Si content was less than 0.06%, the above-described interfacial peeling occurred, and thus the cold workability was not sufficient. In steel sheet Nos. N-2, Y-2, N-3, Y-3, N-5, Y-5, N-6, and Y-6, since the C content was less than 0.3%, the hardenability of the steel decreased, and thus high-frequency quenching hardenability was not sufficient. In steel sheet Nos. O-2, P-2, O-3, P-3, O-5, P-5, O-6, and P-6, since the Mn content exceeded 2.0%, the high-frequency quenching hardenability was not sufficient. In steel sheet Nos. R-2, AA-2, R-3, AA-3, R-5, AA-5, R-6, and AA-6, since the Cr content exceeded 0.10%, the carbide was not sufficiently dissolved during the high-frequency heating, and thus the high-frequency quenching hardenability was not sufficient. In steel sheet Nos. U-2, W-2, U-3, W-3, U-5, W-5, U-6, and W-6, since the C content exceeded 0.6%, the cold workability decreased. In steel sheet Nos. V-2, X-2, V-3, X-3, V-5, X-5, V-6, and X-6, since the S content exceeded 0.0075%, the cold workability was not sufficient. In steel sheet Nos. Z-2, Z-3, Z-5, and Z-6, since the S content exceeded 0.30%, and the P content exceeded 0.03%, the cold workability was not sufficient. In steel sheet Nos. AB-2, AB-3, AB-5, and AB-6, since the V content exceeded 0.5%, the high-frequency quenching hardenability was not sufficient.

Furthermore, a surface treatment film appropriately used for cold working (the medium carbon steel sheet for cold working that includes the surface film) will be described in detail using examples.

(Preparation of Surface Treatment Liquid)

First, surface treatment liquids (chemical agents) a to q, which contained chemical compositions shown in Table 8 to be described below, were prepared. In addition, in Table 8, the reason why a combination of zinc nitrate and phosphoric acid is used as the inorganic acid salt is because zinc phosphate is hardly dissolved in water, and is dissolved in an acid. As described above, when the zinc nitrate that is soluble in water and the phosphoric acid are used in combination, zinc phosphate that is poorly soluble in water is generated to be present in the surface treatment liquid.

TABLE 8

| Chemical agent | Silane coupling agent | | Inorganic compound | | Acid | | Organic compound | | Lubricant | | pH |
|---|---|---|---|---|---|---|---|---|---|---|---|
| | Kind | Additive amount (g/L) | Kind | Additive amount (g/L) | Kind | Additive amount (g/L) | Kind | Additive amount (g/L) | Kind | Additive amount (g/L) | |
| a | 3-aminopropyl trimethoxy silane | 12 | Zinc nitrate | 120 | Phosphoric acid | 3 | Polyamine imide resin | 120 | $MoS_2$ | 20 | 4 |
| b | N-2-(aminomethyl)-3-aminopropyl methyl dimethoxy | 12 | Zinc nitrate | 30 | Phosphoric acid | 3 | Polyamine imide resin | 150 | $MoS_2$ | 20 | 4 |
| c | N-2-(aminomethyl)-3-aminopropyl trimethoxy silane | 12 | Zinc nitrate | 60 | Phosphoric acid | 3 | Polyamine imide resin | 150 | $MoS_2$ | 20 | 4 |
| d | N-2-(aminomethyl)-4-aminopropyl trimethoxy silane | 12 | Potassium molybdate | 60 | Phosphoric acid | 3 | Polyamine imide resin | 150 | PTFE | 20 | 4 |
| e | N-2-(aminomethyl)-5-aminopropyl trimethoxy silane | 12 | Potassium molybdate | 60 | Phosphoric acid | 3 | Polyamine imide resin | 150 | Zno | 20 | 4 |
| f | 3-aminopropyl trimethoxy silane | 12 | Zinc nitrate | 60 | Phosphoric acid | 3 | Polyester resin | 150 | $MoS_2$ | 220 | 4 |
| g | 3-aminopropyl trimethoxy silane | 12 | Zinc nitrate | 60 | Phosphoric acid | 3 | Epoxy resin | 150 | $MoS_2$ | 20 | 4 |
| h | 3-aminopropyl trimethoxy silane | 12 | Zinc nitrate | 40 | Phosphoric acid | 3 | Epoxy resin | 4.3 | Graphite | 20 | 4 |
| i | 3-aminopropyl trimethoxy silane | 12 | Potassium silicate | 1 | — | — | Polyamine imide resin | 100 | $MoS_2$ | 20 | 4 |
| j | 3-aminopropyl trimethoxy silane | 12 | Potassium molybdate | 40 | — | — | Fluorine resin | 40 | $MoS_2$ | 200 | 4 |
| k | 3-aminopropyl trimethoxy silane | 12 | Potassium Tungstate | 40 | — | — | Fluorine resin | 100 | $MoS_2$ | 20 | 4 |
| l | 3-aminopropyl trimethoxy silane | 1 | Zinc nitrate | 120 | Phosphoric acid | 3 | Polyamine imide resin | 120 | Graphite | 20 | 4 |
| m | 3-aminopropyl trimethoxy silane | 100 | Zinc nitrate | 12 | Phosphoric acid | 3 | Polyamine imide resin | 12 | Graphite | 20 | 4 |
| n | 3-aminopropyl trimethoxy silane | 12 | Zinc nitrate | 1 | Phosphoric acid | 0.5 | Polyamine imide resin | 150 | $MoS_2$ | 20 | 4 |
| o | 3-aminopropyl trimethoxy silane | 12 | Zinc nitrate | 150 | Phosphoric acid | 50 | Polyamine imide resin | 1.5 | $MoS_2$ | 20 | 4 |

TABLE 8-continued

| Chemical agent | Silane coupling agent | | Inorganic compound | | Acid | | Organic compound | | Lubricant | | pH |
|---|---|---|---|---|---|---|---|---|---|---|---|
| | Kind | Additive amount (g/L) | Kind | Additive amount (g/L) | Kind | Additive amount (g/L) | Kind | Additive amount (g/L) | Kind | Additive amount (g/L) | |
| p | 3-aminopropyl trimethoxy silane | 12 | Zinc nitrate | 60 | Phosphoric acid | 3 | Polyamine imide resin | 150 | $MoS_2$ | 2 | 4 |
| q | 3-aminopropyl trimethoxy silane | 12 | Zinc nitrate | 5 | Phosphoric acid | 1 | Polyamine imide resin | 5 | $MoS_2$ | 150 | 4 |

(Manufacturing of Surface Film Steel Sheet)

Next, surface treated steel sheets (Nos. 1 to 29), in which a gradient-type surface treatment film having three-layer structure was formed on both surfaces of the sheets, were manufactured by the following method by using the surface treatment liquids a to q that were prepared as described above (refer to Table 10 to be described below).

The method of manufacturing the surface treated steel sheet will be described in detail. Steel having chemical compositions shown in Table 9 was casted by a common converter and a vacuum degassing treatment and a slab was prepared. Furthermore, the cast slab was held at 1,220° C. for 1 hour, and was hot-rolled under conditions in which the rolling termination temperature was 870° C. to obtain a hot-rolled steel sheet having a sheet thickness of 8 mm. Then, this hot-rolled steel sheet was cooled to 670° C. at an average cooling rate of 30° C./second, was cooled to 560° C. at a cooling rate of 15° C./second, and then was wound. The wound hot-rolled steel sheet was further cooled to 400° C. for 20 hours. The obtained hot-rolled steel sheet was annealed under a hydrogen 95% atmosphere at 700° C. for 30 hours, and then was subjected to furnace cooling. The surface treatment liquids a to q were applied onto the annealed hot-rolled steel sheet (annealed steel sheet) with coating #3 bar (coating bar). The film thickness of the surface treatment film was controlled through the concentration of the surface treatment liquid. Furthermore, the annealed steel sheet onto which the surface treatment liquid was applied was dried in a hot air drying furnace of 300° C. under conditions in which an arrival sheet temperature became 150° C. After the drying, the steel sheet was cooled with air to prepare a surface treated steel sheet.

In addition, a quenching sample having dimensions of sheet thickness: 8 mm×sheet width: 15 mm×sheet length: 100 mm was collected from the annealed steel sheet before being subjected to the surface treatment, and this sample was heated at a frequency of 78 kHz from room temperature to 1,000° C. at an average heating rate of 100° C./second, was held at 1,000° C. for 10 seconds, and was rapidly cooled to room temperature at an average cooling rate of 200° C. or higher. Then, the Vickers hardness (quenching hardness) of the quenched material was measured. Furthermore, the average diameter of the carbide of the annealed steel sheet and the spheroidizing ratio of the carbide were measured using the above-described method. As a result, it was confirmed that the average diameter of the carbide was 0.31 μm, the spheroidizing ratio was 85.7%, and the hardness after the high-frequency quenching was 638.7 HV

TABLE 9

| Steel component (mass %) | | | | | | | |
|---|---|---|---|---|---|---|---|
| C | Si | Mn | P | S | Al | N | Cr |
| 0.46 | 0.13 | 0.72 | 0.012 | 0.0051 | 0.018 | 0.0026 | 0.06 |

(Measurement of Film Thickness)

Measurement of the film thickness was carried out using the high-frequency GDS with respect to the surface treated steel sheet that was obtained. Specifically, the distance from the outermost surface of the surface treatment film to a position (depth) in the film thickness direction, at which peak intensity was 1/2 times the maximum value of the peak intensity with regard to the representative element (for example, Mo or C) of the lubricant in the high-frequency GDS measurement chart, was measured to determine the thickness of the lubricant layer. In addition, a distance from the interface between the surface treatment film and the steel sheet to a position (depth) in the film thickness direction, at which peak intensity was 1/2 times the maximum value of the peak intensity with regard to the representative element (Si) of the chemical composition derived from the silanol bond in the high-frequency GDS measurement chart, was measured to determine the thickness of the adhesion layer. Furthermore, the distance from the position at which peak intensity was 1/2 times the maximum value of the peak intensity with regard to the representative element (Mo) of the lubricant to a position, at which peak intensity was 1/2 times the maximum value of the peak intensity with regard to the representative element (Si) of the chemical composition derived from the silanol bond, was measured (calculated) to determine the thickness of the base layer. In addition, the measurement was carried out using elements that were different from each other as the representative element so that the representative element of the lubricant layer (lubricant component) and the base layer (inorganic acid salt component), and the representative element of the base layer (inorganic acid salt component) and the adhesion layer (chemical composition derived from the silanol bond) were not the same as each other.

For example, in a case of using graphite as the lubricant, the thickness of the lubricant layer and the base layer was obtained using peak intensity of the representative element (P, Si, Mo, or W) of the inorganic acid salt.

(Evaluation Method and Evaluation Standard)

Furthermore, the film adhesiveness and workability of the surface treated steel sheet, which was manufactured as described above, were evaluated based on the following evaluation method and evaluation standard.

<Evaluation of Film Adhesiveness>

The film adhesiveness was evaluated by a drawing sliding test using a flat bead mold. In this drawing sliding test, a test specimen (sample), from which shearing burr was removed and which had a size of 30×200 mm, was collected from the surface treated steel sheet and was used. In addition, the intensity (intensity before test) of a main constituent element in the film was measured by a fluorescent X-ray analysis device before carrying out the sliding test with respect to the sample.

As the flat bead mold, a pair of molds, which had a length of 40 mm, a width of 60 mm, and a thickness of 30 mm, of which material was SKD11, and of which surface was polished with emery paper of #1,000, were prepared. Next, the sample was interposed between the molds, was pressed with 1,000 kg by an air cylinder, and then the sample was drawn by a drawing tester. With respect to the sample after the drawing, intensity (intensity after test) of the above-described element was measured by the fluorescent X-ray analysis device, and a remaining rate (intensity after test/intensity before test)×100[%] was calculated.

With regard to evaluation standard of the film adhesiveness, a case where the remaining rate was less than 70% was evaluated as "poor", a case where the remaining rate was equal to or more than 70% and less than 90% was evaluated as "good", and a case where the remaining rate was 90% or more was evaluated as "excellent."

<Evaluation of Workability>

Figure 7A:
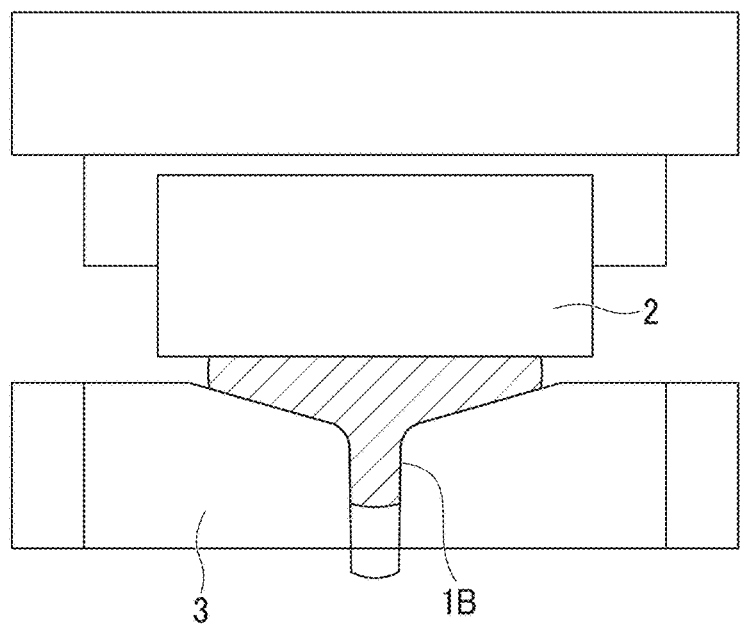
FIG. 7A is a schematic diagram illustrating a spike test method.
Figure 7B:
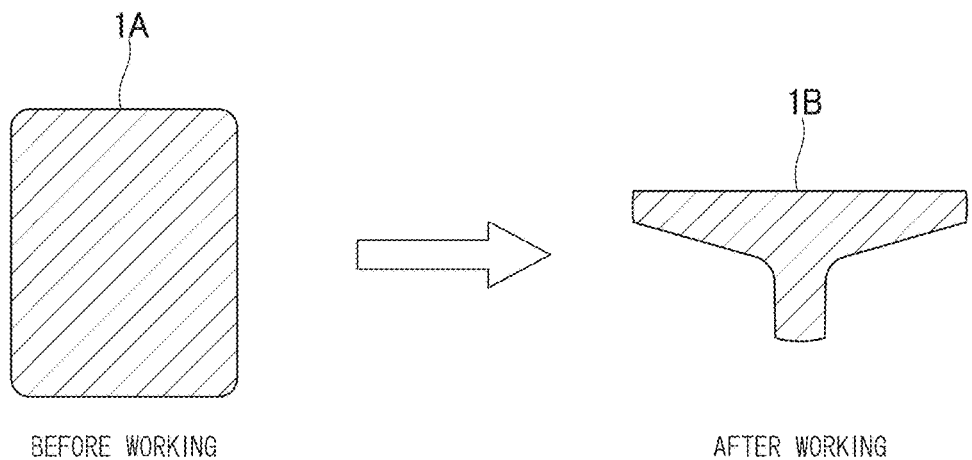
FIG. 7B is a schematic diagram illustrating shapes of a spike test specimen before and after working.

The workability was evaluated by a spike test. In this spike test, first, a columnar spike test specimen 1A (spike test specimen 1A before working of FIG. 7B) prepared from the surface treated steel sheet was mounted on a die 3 having a funnel-like internal shape shown in FIG. 7A. Then, load was applied to the spike test specimen 1A through a plate 2 shown in FIG. 7A to insert the test specimen 1A into a die 3, whereby the spike test specimen 1A was shaped into to have a shape of a spike test specimen 1B after working as shown in FIG. 7B. The spike conforming to a die shape was formed with this method, and lubricity was evaluated by the height of the spike at this time. Therefore, the higher the height (mm) of the spike is, the further the lubricity is excellent. In addition, conditions of the spike test were conformed to a method disclosed in Japanese Unexamined Patent Application, First Publication No. H05-7969.

With regard to evaluation standards of the workability, evaluation was carried out using the height of the spike. A case where the height of the spike was less than 12.5 mm was evaluated as "poor", a case where the height of the spike was 12.5 to 13.5 mm was evaluated as "good", and a case where the height of the spike exceeded 13.5 mm was evaluated as "excellent". In addition, the evaluation as "good" corresponds to the performance of the sample that was prepared by forming the composite film (chemical reaction/soap treatment) on the same steel sheet in the related art.

Measurement results of the thickness of each layer, the film adhesiveness, and the workability, which were obtained by performing the measurement as described above, are shown in Table 10.

TABLE 10

| No. | Chemical agent | Base layer Adhesion layer Thickness (nm) | Base layer Thickness (µm) | Base layer Inorganic acid salt/heat resistant resin (—, mass ratio) | Lubricant layer Thickness (µm) | Lubricant layer/base layer (—) | Film adhesiveness | Cold workability |
|---|---|---|---|---|---|---|---|---|
| 1 | a | 10 | 4 | 1 | 1 | 0.25 | Excellent | Excellent |
| 2 | b | 15 | 4 | 0.2 | 0.4 | 0.1 | Excellent | Excellent |
| 3 | c | 10 | 4 | 0.4 | 1 | 0.25 | Excellent | Excellent |
| 4 | c | 12 | 0.2 | 0.4 | 0.1 | 0.5 | Excellent | Good |
| 5 | c | 13 | 15 | 0.4 | 7.5 | 0.5 | Excellent | Good |
| 6 | c | 13 | 0.5 | 0.4 | 1 | 2 | Excellent | Excellent |
| 7 | c | 13 | 3 | 0.4 | 1 | 0.33 | Excellent | Excellent |
| 8 | c | 0.1 | 4 | 0.4 | 1 | 0.25 | Good | Excellent |
| 9 | c | 0.5 | 4 | 0.4 | 1 | 0.25 | Excellent | Excellent |
| 10 | c | 50 | 4 | 0.4 | 1 | 0.25 | Excellent | Excellent |
| 11 | c | 100 | 4 | 0.4 | 1 | 0.25 | Good | Excellent |
| 12 | d | 11 | 4 | 0.4 | 1 | 0.25 | Excellent | Excellent |
| 13 | e | 12 | 4 | 0.4 | 1 | 0.25 | Excellent | Excellent |
| 14 | f | 11 | 4 | 0.4 | 10 | 2.5 | Excellent | Good |
| 15 | g | 10 | 4 | 0.4 | 2 | 0.5 | Excellent | Good |
| 16 | h | 11 | 4 | 10 | 0.5 | 0.125 | Excellent | Good |
| 17 | i | 11 | 4 | 0.01 | 2 | 0.5 | Excellent | Excellent |
| 18 | j | 12 | 0.1 | 1 | 1 | 10 | Excellent | Excellent |
| 19 | k | 11 | 4 | 0.4 | 0.5 | 0.125 | Excellent | Excellent |
| 20 | c | 13 | 0.1 | 0.4 | 0.05 | 0.5 | Excellent | Poor |
| 21 | c | 12 | 4 | 0.4 | 12 | 3 | Excellent | Poor |
| 22 | c | 12 | 0.05 | 0.4 | 0.5 | 10 | Excellent | Poor |
| 23 | c | 11 | 16 | 0.4 | 8 | 0.5 | Excellent | Poor |
| 24 | l | 0.05 | 4 | 0.4 | 1 | 0.25 | Poor | Poor |
| 25 | m | 150 | 2 | 0.4 | 1 | 0.5 | Poor | Poor |
| 26 | n | 14 | 2 | 0.008 | 1 | 0.5 | Excellent | Poor |
| 27 | o | 13 | 2 | 12 | 1 | 0.5 | Excellent | Poor |
| 28 | p | 13 | 10 | 0.4 | 1 | 0.1 | Excellent | Poor |
| 29 | q | 12 | 1 | 0.4 | 15 | 15 | Excellent | Poor |

As shown in Table 10, in the surface treated steel sheets of Nos. 1 to 19, the film adhesiveness and the workability were excellent. On the other hand, in the surface treated steel sheets of Nos. 24 and 25, since the thickness of the adhesion layer was not optimized, the film adhesiveness was inferior to the surface treated steel sheets of Nos. 1 to 19. Furthermore, in the surface treated steel sheets of Nos. 20 to 29, since one of the conditions of each layer was not optimized, the workability (lubricity) was inferior to the surface treated steel sheets of Nos. 1 to 19.

INDUSTRIAL APPLICABILITY

As described above, according to the present invention, a medium carbon steel sheet for cold working, which is excellent in high-frequency hardenability, and a manufacturing method thereof may be provided. Accordingly, the present invention has an important role of greatly enlarging a use of the medium carbon steel sheet in which the high-frequency quenching is used, and thus applicability of the present invention is high in the steel product manufacturing industry.

The invention claimed is:

1. A medium carbon steel sheet for cold working that has a hardness of 500 HV to 900 HV in a case of being subjected to high-frequency quenching in which a temperature is raised at an average heating rate of 100° C./second, the temperature is held at 1,000° C. for 10 seconds, and a quick cooling to a room temperature is carried out at an average cooling rate of 200° C./second, the medium carbon steel sheet comprises,
C: 0.30 to 0.60 mass %,
Si: 0.06 to 0.30 mass %,
Mn: 0.3 to 2.0 mass %,
P: 0.030 mass % or less,
S: 0.0075 mass % or less,
Al: 0.005 to 0.10 mass %,
N: 0.001 to 0.01 mass %, and
Cr: 0.001 to 0.10 mass %,
and a balance composed of Fe and inevitable impurities, wherein
an average diameter d of a carbide is 0.37 μm or less, a spheroidizing ratio p of the carbide is equal to or more than 70% and less than 90%, and the average diameter d in μm of the carbide and the spheroidizing ratio p in % of the carbide satisfy $d \leq 0.04 \times p - 2.6$.

2. The medium carbon steel sheet for cold working according to claim 1,
further comprises one or more of,
Ni: 0.01 to 0.5 mass %,
Cu: 0.05 to 0.5 mass %,
Mo: 0.01 to 0.5 mass %,
Nb: 0.01 to 0.5 mass %,
Ti: 0.001 to 0.05 mass %,
V: 0.01 to 0.5 mass %,
Ta: 0.01 to 0.5 mass %,
B: 0.001 to 0.01 mass %,
W: 0.01 to 0.5 mass %,
Sn: 0.003 to 0.03 mass %,
Sb: 0.003 to 0.03 mass %, and
As: 0.003 to 0.03 mass %.

3. The medium carbon steel sheet for cold working according to claim 2,
wherein a Cr content [Cr mass %] and a Mo content [Mo mass %] satisfy [Cr mass %]+[Mo mass %]/10<0.10.

4. The medium carbon steel sheet for cold working according to claim 1 or 2,
wherein the hardness prior to cold working is greater than or equal to 120 HV and less than 170 HV.

* * * * *